United States Patent
Park et al.

(10) Patent No.: US 7,878,018 B2
(45) Date of Patent: Feb. 1, 2011

(54) KIMCHI REFRIGERATOR AND CONTROL METHOD OF THE SAME

(75) Inventors: Eun Young Park, Ulsan (KR); Yeon Yi Hwang, Busan (KR); Seok Min Lim, Gyeongsangnam-do (KR); Eun Jeong Kim, Gyeongsangnam-do (KR); Deul Re Min, Seoul (KR)

(73) Assignee: LG Electronics Inc., Seoul (KR)

( * ) Notice: Subject to any disclaimer, the term of this patent is extended or adjusted under 35 U.S.C. 154(b) by 340 days.

(21) Appl. No.: 11/655,294

(22) Filed: Jan. 19, 2007

(65) Prior Publication Data

US 2007/0180843 A1    Aug. 9, 2007

(30) Foreign Application Priority Data

Jan. 25, 2006  (KR)  ............... 10-2006-0007708
Sep. 19, 2006  (KR)  ............... 10-2006-0090480

(51) Int. Cl.
  *F25D 23/00*  (2006.01)
(52) U.S. Cl. ............... 62/264; 62/177; 99/467; 99/468; 99/470; 99/474; 99/517
(58) Field of Classification Search ............... 62/264, 62/177; 99/467, 468, 470, 474, 517
  See application file for complete search history.

(56) References Cited

U.S. PATENT DOCUMENTS 5,458,186 A * 10/1995 Lee et al. ............... 165/263
5,901,564 A * 5/1999 Comeau, II ............... 62/264
6,063,420 A * 5/2000 Chun et al. ............... 426/231
6,190,712 B1 * 2/2001 Nam ............... 426/231
6,726,341 B2  4/2004 Pashley et al.
2003/0072147 A1  4/2003 Pashley et al.

FOREIGN PATENT DOCUMENTS

| | | |
|---|---|---|
| JP | 61-1271949 | 12/1986 |
| JP | 2001-061459 | 3/2001 |
| JP | 2001-082869 | 3/2001 |
| JP | 2005/065622 | 3/2005 |
| JP | 2005065622 A * | 3/2005 |
| JP | 2005-124485 | 5/2005 |
| JP | 2006-183999 | 7/2006 |
| KR | 10-2005-0018128 | 2/2005 |
| KR | 10-2006-0044121 | 5/2006 |
| KR | 10-2006-0048024 | 5/2009 |

OTHER PUBLICATIONS

Korean Notice of Allowance dated Feb. 1, 2008.
Japanese Notice of Allowance dated Feb. 16, 2010.

* cited by examiner

*Primary Examiner*—Cheryl J Tyler
*Assistant Examiner*—Justin Loffredo
(74) *Attorney, Agent, or Firm*—KED & Associates, LLP

(57) ABSTRACT

A refrigerator and control method thereof are provided. The refrigerator emits light into a storage compartment formed therein to improve and preserve taste of food items stored therein. The refrigerator may include a light emitting unit to emit light into the storage compartment and onto the food items stored therein to improve and preserve taste of the food items.

15 Claims, 16 Drawing Sheets

KIMCHI REFRIGERATOR AND CONTROL METHOD OF THE SAME

CROSS-REFERENCE TO RELATED APPLICATION

This application claims the benefit of Korean Patent Application Nos. 10-2006-0007708 filed on Jan. 25, 2006 and 10-2006-0090480 filed on Sep. 19, 2006, which is hereby incorporated by reference in its entirety as if fully set forth herein.

BACKGROUND OF THE INVENTION

1. Field of the Invention

The present invention relates to a Kimchi refrigerator, and more particularly, to a Kimchi refrigerator that emits light into storage compartments, in which Kimchi is stored, to improve taste of the Kimchi and a control method of the same.

2. Discussion of the Related Art

Generally, a Kimchi refrigerator is a refrigerator manufactured to ferment Kimchi and keep it with the same taste as possible as it can. The Kimchi refrigerator can store Kimchi with keeping the taste for a longer period of time than ordinary refrigerators. In addition, the Kimchi refrigerator can control the fermenting state of the Kimchi. Furthermore, the Kimchi refrigerator adopts the principle of a Korean Kimchi jar buried in the ground to ferment and keep Kimchi during the winter season, so as to minimize the change in temperature of Kimchi and prevent the Kimchi from contacting air to be changed in terms of taste, thereby maintaining the taste of the Kimchi in a fresh state for a long period of time.

Generally, the keeping temperature of a conventional Kimchi refrigerator is maintained between 0° C. and −2° C. because it is known that the change in acidity of Kimchi is the smallest in this range of temperature. A temperature of the storage compartment may be controlled by a method of circulating cool air by force using a cooling fan or by a natural convention in the storage compartment.

The latter is characterized in that the cooling speed is relatively slow, the power consumption is small, and the noise is small. For this reason, the latter is mainly used for small-sized refrigerators. The former is characterized in that the cooling speed is relatively fast, the power consumption is large, and the noise is big. For this reason, the former is mainly used for large-sized refrigerators.

A brief description will be given below as to how storage compartments of a Kimchi refrigerator are cooled by a cooling system in the Kimchi refrigerator.

Refrigerant is compressed into a high temperature and high pressure state by a compressor, and the high-temperatured and high-pressured refrigerant is transmitted to a condenser through a refrigerant pipe. Subsequently, the refrigerant is liquefied by the condenser, and the liquefied refrigerant is transmitted to an expansion valve through a refrigerant pipe. The refrigerant changes into a low temperatured and low pressured state through the expansion valve. The low-temperatured and low-pressured refrigerant is transmitted to an evaporator, which is mounted such that the evaporator surrounds the outsides of the storage compartments. The refrigerant is evaporated in the evaporator. As a result, the refrigerant instantaneously takes heat away from the periphery of the refrigerant, and therefore, the storage compartments, in which Kimchi is stored, are cooled.

Hereinafter, the storage compartment structure of a conventional Kimchi refrigerator will be described with reference to FIG. 1.

A conventional Kimchi refrigerator 10 includes upper Kimchi storage compartments 21 and lower Kimchi storage compartments 31 for storing Kimchi. The conventional Kimchi refrigerator 10 also includes upper doors 27 to open and close the corresponding upper Kimchi storage compartments 21 in a hingedly rotating fashion, and lower doors 37 to open and close the corresponding lower Kimchi storage compartments 31 in a sliding fashion.

The upper doors 27 are mounted at the top part of a refrigerator body of the Kimchi refrigerator 10 to open and close the corresponding upper Kimchi storage compartments 21, whereas the lower doors 37 are mounted at the front part of the refrigerator body of the Kimchi refrigerator 10 to open and close the corresponding lower Kimchi storage compartments 31. The upper doors 27 are constructed in a structure in which the upper doors 27 are opened and closed in a hingedly rotating fashion, whereas the lower doors 37 are constructed in a structure in which the lower doors 37 are opened and closed in a sliding fashion.

The doors 27 and 37 may be made of the same material as the refrigerator body of the Kimchi refrigerator 10. In addition, the doors 27 and 37 may be filled with a heat insulating material. Gaskets (not shown) are mounted at the edges of the respective upper and lower doors 27 and 37 to seal the Kimchi storage compartments 21 and 31, thereby preventing the inflow and outflow of air between the Kimchi storage compartments 21 and 31 and the outside of the Kimchi refrigerator 10.

Although not shown, on the other hand, an additional machinery compartment is located in the refrigerator body of the Kimchi refrigerator 10. In the machinery compartment are mounted several parts for a cooling system such as a compressor to compress refrigerant flowing through an evaporator while the parts are connected with each other. In addition, various parts such as various kinds of control units and various kinds of sensors, which are necessary to ripen Kimchi and store the Kimchi for a long period of time, are mounted at predetermined positions in the Kimchi refrigerator 10.

At the front part of the refrigerator body of the Kimchi refrigerator 10 is mounted a control panel 40 to control the overall operation of the Kimchi refrigerator.

In the above, the Kimchi refrigerator in which the Kimchi storage compartments are located at the upper and lower parts of the Kimchi refrigerator was described as an example. However, a Kimchi refrigerator in which the upper and lower parts are not divided or a Kimchi refrigerator in which refrigerating compartments to store various kinds of food or freezing compartments to store various kinds of food are integrally coupled with each other may be also used.

In the conventional Kimchi refrigerator with the above-stated construction, the inside temperature of the storage compartments is adjusted to control the degree of fermentation. However, controlling the degree of fermentation by the adjustment of the temperature has a limit. More specifically, Kimchi gets to have a delicious taste, i.e., a stinging taste which is very characteristic to Kimchi, a certain period of time after the Kimchi is made. However, as time goes, the degree of stinging taste is reduced and a sour taste of the Kimchi is increased.

Most users prefer Kimchi that is appropriately fermented and therefore provides a delicious taste. However, it is very difficult to obtain in a short period of time well-fermented Kimchi which has such a delicious taste and to maintain the delicious taste for a long time.

Furthermore, the conventional Kimchi can store Kimchi for only 6 months in terms of taste. After 6 months are passed since the Kimchi was made and put into the refrigerator, the taste becomes too acid to eat. This is because, even during the storage of the Kimchi in the keeping mode, the taste of the Kimchi gradually changes up to the point where the Kimchi is too acid and not suitable for eating.

SUMMARY OF THE INVENTION

The present invention is directed to a Kimchi refrigerator and a control method of the same that substantially obviate one or more problems due to limitations and disadvantages of the related art.

An object of the present invention is to provide a Kimchi refrigerator that emits light into storage compartments to improve taste of Kimchi stored in the storage compartments and a control method of the same.

Another object of the present invention is to provide a Kimchi refrigerator that changes the color of light emitted into storage compartments based on modes of the Kimchi refrigerator to improve taste of Kimchi stored in the storage compartments and a control method of the same.

A further object of the present invention is to provide a Kimchi refrigerator that performs a cold shock operation during the storage of Kimchi in a keeping mode to maintain the taste of the Kimchi for an extended period of time, and controls the color of light emitted into storage compartments at the time of the cold shock operation to improve taste of Kimchi stored in the storage compartments and a control method of the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a Kimchi refrigerator includes a light emitting unit to emit light into a storage compartment, in which Kimchi is stored. The light is emitted to Kimchi, whereby the taste of the Kimchi is improved.

Preferably, the light emitted from the light emitting unit is light having a visible ray band.

The visible ray is light having a range of wavelengths that are visible to the human eye. The range of the wavelengths is between approximately 380 to 770 nm, although it may be slightly different for every person.

In the visible ray, the changes of the properties depending upon the wavelengths are represented by corresponding colors. The wavelengths are shortened from red to violet. In the case of monochromatic light, for example, a light component having the wavelengths of 700 to 610 nm is represented by red, a light component having the wavelengths of 610 to 590 nm is represented by orange color, a light component having the wavelengths of 590 to 570 nm is represented by yellow, a light component having the wavelengths of 570 to 500 nm is represented by green, a light component having the wavelengths of 500 to 450 nm is represented by deep blue, and a light component having the wavelengths of 450 to 400 nm is represented by violet.

When light having an infrared ray band the wavelength of which is longer than 770 nm is emitted, the inside temperature of the storage compartment may be increased, and, at the same time, the surface temperature of food stored in the storage compartment may be increased.

The red-based visible ray band and the infrared ray band may not be exactly distinguished from each other. Also, the violet-based visible ray band and the ultraviolet ray band may not be exactly distinguished from each other.

Consequently, the visible ray band includes some of the infrared ray band and the ultraviolet ray band having the range of wavelengths adjacent to the visible ray band.

Preferably, the emitting unit has at least two lights for emitting two different colored light.

Preferably, the emitting unit emits at least one of deep blue light, green light, and yellow light.

Principal lactic acid bacteria to ferment Kimchi include *Lactobacillus plantarum* (hereinafter, simply referred to as "*Lactobacillus*") and *Leuconostoc mesenteroides* (hereinafter, simply referred to as "*Leuconostoc*"). In the present invention, light is emitted to Kimchi by the emitting unit so as to control the growth of the bacteria, thereby improving the taste of the Kimchi.

When the Kimchi is fermented, the growth of the *Leuconostoc*, which provides the Kimchi with a cool and refreshing taste, is accelerated, and, when the Kimchi is in a keeping mode after the fermentation, the growth of the *Lactobacillus*, which provides the Kimchi with a sour taste, is restrained, whereby the taste of the Kimchi is improved.

Preferably, green light is emitted when the Kimchi is in fermentation mode, and yellow light or deep blue light is emitted when the Kimchi is in a keeping mode after the fermentation of the Kimchi.

More preferably, white light is emitted together with the green light, and white light is emitted together with the yellow light or the deep blue light.

It has been proved that the effect of the light emission is further increased when the green light, the yellow light, or the deep blue light is emitted together with the white light.

Hereinafter, the principle of improving the taste of Kimchi by the emitting unit will be described in more detail.

Kimchi is a lactic acid bacteria-fermented food that goes through a ripening or fermenting process. As the lactic acid bacteria are increased, disease-causing microorganisms are sterilized, and the sugar content contained in the Kimchi is changed into lactic acid, whereby the taste of the Kimchi becomes cool and fresh.

In the early stage, the Kimchi is fermented and ripened by the *Leuconostoc*. The *Lactobacillus* serves to destroy harmful bacilli but becomes a cause to make the Kimchi taste sour by acting to make too much acid. It is known that the *Leuconostoc* makes dietary fiber, such as dextran, thereby accelerating metabolism, and therefore, promoting digestion and relieving constipation.

In addition, the *Leuconostoc* provides the Kimchi with a stinging taste. When the amount of acid is increased during the fermentation of the Kimchi, the amount of the *Leuconostoc* is sharply decreased. The *Lactobacillus* does not exist immediately after the Kimchi is made, but lasts once generated.

Consequently, it is preferable to increase the amount of the *Leuconostoc* such that the Kimchi can be fermented and ripened deliciously at the initial stage and to maximally restrain the growth of the *Lactobacillus* such that the taste of the Kimchi can be maintained for a long period of time after the Kimchi is ripened.

As a result of experiments, the inventors have found that, when appropriate light is emitted to the fermented Kimchi, the amount of the *Leuconostoc* is increased, and the growth of the *Lactobacillus* is restrained.

In consideration of the above findings, the inventors performed experiments to emit light to the Kimchi with changing the color of the light at the early Kimchi fermentation stage and at the middle Kimchi fermentation stage so as to measure the change in amount of the *Leuconostoc* and the *Lactobacillus*.

As a result of the experiments, the amount of the *Leuconostoc* was greatly increased by a combination of green and white light emitting diodes at the early Kimchi fermentation stage. The growth of the *Lactobacillus* was greatly restrained by a combination of yellow and white light emitting diodes and a combination of deep blue and white light emitting diodes at the middle Kimchi fermentation stage.

The experiment results reveals that it is preferable for the light to include white light, which has a good influence both on the ripening and the keeping of the Kimchi, irrespective of the fermentation degree of the Kimchi, and it is particularly preferable for the light to be emitted by combination of white light and any one of green light, yellow light and deep blue light.

In addition, it has been proved through experiments that it is preferable for the emitting unit to emit different combinations between a fermentation mode and a keeping mode, wherein the fermentation mode is to ferment the stored Kimchi and the keeping mode is to store the Kimchi for a long period of time in the condition that the fermentation of the Kimchi is maximally restrained.

More specifically, it is preferable to emit a combination of green light and white light in the fermentation mode and to emit a combination of white light and one of yellow light and deep blue light in the keeping mode.

Recently, many users store vegetables or fruits in the storage compartments as well. In this case, when a combination of green light and white light is emitted to the vegetables or the fruits, the degree of freshness of the vegetables or the fruits can be maintained for a long period of time.

The following table shows the characteristics of vegetables based on light emitted to the vegetables. In the table, R indicates red light, G indicates green, B indicates deep blue, W indicates white, and Y indicates yellow.

| Names | Advantageous characteristics | Disadvantageous characteristics |
| --- | --- | --- |
| Cabbage | R, W - Small widening between tissues of cabbage | C, YW - Widening between leaves of cabbage |
| | B, GY - Little discoloration, small change of tissues | C, R, RB, BW - Widening between leaves of cabbage and darkened |
| | G - Minimum discoloration | C, RB, RW - Widening between leaves of cabbage |
| Green Chinese miniature cabbage | W, YB, YW - The most maintained initial state | C - Great discoloration and dryness |
| | GW - Little dryness | R -Greater dryness |
| | RB - The most maintained tissues, little discoloration | B, C, G - Discoloration to yellow, great dryness |
| Strawberry | RY, RW - The most maintained initial characteristics | C, Y - Great change |
| | B, GY - Little discoloration, well maintained tissues | G, BW - Generation of much mold |
| | RW - Little discoloration, well maintained tissues | C, RB, G - Generation of much mold |

When the vegetables are stored, the emitting unit may be constructed to emit light according to the above-described characteristics.

The emitting unit may include at least one light emitting diode (LED). The at least one light emitting diode emits light having a specific wavelength band, which is further effective.

More preferably, the emitting unit includes a window to disperse light emitted from the at least one light emitting diode and uniformly emit the dispersed light to the Kimchi. The light generated from the at least one light emitting diode is dispersed through the window, and is then uniformly emitted into the storage compartment.

When the emitting unit includes a green light emitting diode, a yellow light emitting diode, and a white light emitting diode, it is preferable that the white light emitting diode is located between the green light emitting diode and the yellow light emitting diode.

When the green light and the white light are emitted at positions adjacent to each other, the emitted regions and the degree of emission become similar to each other, which provide desirable results. The emission of the yellow light and the white light at positions adjacent to each other provides the same results as the above case.

Preferably, the emitting unit emits different colored light depending upon the control mode of the Kimchi refrigerator.

For example, as described above, the emitting unit emits green light and white light together in the fermentation mode. The emitting unit emits white light and one of yellow light and deep blue light in the keeping mode.

A plurality of emitting units may be mounted in one storage compartment. In this case, the emitting units individually emit light to a plurality of Kimchi storage containers received in the storage compartment. For example, Kimchi may be stored in one of the storage containers, and vegetables may be stored in another storage container. At this time, colors of the light emitted to the respective storage containers may be different.

When the storage compartment is filled with the Kimchi storage containers, some of the Kimchi storage containers may be positioned near to the ceiling of the storage compartment. In this case, the emission range of the light emitted from one emitting unit may be small. For this reason, the plurality of emitting units are provided to uniformly emit light into the storage compartment.

Also, it is preferable that the emitting unit be mounted at the upper part of the storage compartment. For example, the emitting unit may be mounted at the ceiling of the storage compartment.

As the emitting unit is used for a long period of time, heat may be generated from the emitting unit. If the emitting unit is mounted at the upper part of the storage compartment, the effect due to the heat is minimized. Also, the light is emitted to the lower part of the storage compartment from the upper part of the storage compartment, whereby the light is uniformly emitted into the storage compartment.

Also, only the cover of the storage container received in the storage compartment may be made of a material transmitting the light. Consequently, it is preferable to emit the light downwardly from the upper part of the storage compartment.

According to circumstances, the emitting unit may be constructed to emit the light toward the rear lower part of the storage compartment from the front upper part of the storage compartment.

For example, when the storage compartment is constructed in a drawer-type structure, it is preferable that the emitting unit be mounted at the front upper part of the drawer. In this case, when the emitting unit is out of order, it is easy to pull out the drawer and to repair the emitting unit.

The intensity and the emission time of the light emitted from the emitting unit may be appropriately set in connection with the taste of the Kimchi.

In another aspect of the present invention, a Kimchi refrigerator includes an input unit that allows a user to select and input a desired taste, an emitting unit to emit at least two different colored light, a cooling system to cool a storage compartment, and a control unit to control the cooling system to perform, while a keeping mode is performed, a cold shock operation in which the storage compartment is cooled to a cold shock temperature lower than a temperature of a keeping mode for a predetermined period of time. The control unit controls the emitting unit to emit different light in color between at least one section of the keeping mode and at least one section of the cold shock operation.

The cold shock operation is for giving a cold shock to Kimchi so as to restrain the growth of *Lactobacillus* and thus maximally restrain a sour taste of the Kimchi, thereby maintaining the Kimchi in a delicious state.

Preferably, the cold shock operation is performed when the keeping mode is initiated.

Preferably, the cold shock operation is continuously performed at predetermined time intervals in the keeping mode.

Also preferably, the cold shock operation is performed at least once when a door is opened and then closed. The detection of the opening and closing of the door may be performed by using a door sensor which is well known.

Also preferably, the cold shock operation is performed even when the inside temperature of the storage compartment exceeds a predetermined temperature level. In the keeping mode, the storage compartment is controlled to be maintained at a predetermined temperature. At this time, the inside temperature of the storage compartment may be increased. It is preferable to perform the cold shock operation in this case too.

Especially, when a user opens the door and maintains the door in the opened state for a certain period of time so as to take some of the Kimchi out of the storage compartment, cool air in the storage compartment is discharged to the outside. In this case, it is necessary to supplement cool air. The cold shock operation is performed to apply cold shock to the Kimchi beyond the degree of cool air supply, thereby improving the taste of the Kimchi.

For example, the user may take the Kimchi storage container out of the storage compartment and take some of the Kimchi from the Kimchi storage container. At this time, the inside of the storage container and the Kimchi stored in the storage container are exposed to external warm air. As a result, the external warm air is introduced to the Kimchi, and therefore, the external warm air remains in and near the Kimchi.

The warm air introduced into the inside of the Kimchi storage container or remaining in the Kimchi accelerates the growth of *Lactobacillus*. As a result, the sour taste of the Kimchi is further increased.

When the cold shock operation is performed, however, the temperature of the warm air introduced into the inside of the Kimchi storage container or remaining in the Kimchi is rapidly lowered, and cold shock is applied to the Kimchi. As a result, the growth of the *Lactobacillus* is restrained, and therefore, the sour taste of the Kimchi is not increased.

Consequently, the cold shock operation helps to maintain the taste of the Kimchi. More preferably, the cold shock operation can be performed from a point of time selected by the user.

After the Kimchi is fermented and ripened through the fermentation mode, the Kimchi is stored for a long period of time in the keeping mode. Even in the keeping mode, the fermentation process continues, although the degree of fermentation is low. Consequently, when the user tastes the Kimchi in the keeping mode and recognizes that the taste of the Kimchi is suitable to user's taste, it is preferable that the user press an input button to input a command for the commencement of the cold shock operation.

As a result, the cold shock operation is repeatedly performed, whereby the taste of the Kimchi selected by the user can be maintained for the remaining storage period.

More preferably, the keeping mode includes a first keeping mode and a second keeping mode, wherein a temperature of the second keeping mode is lower than a temperature of the first keeping mode.

When the user inputs a command, while the first keeping mode is performed after the fermentation mode, for the mode change from the first keeping mode to the second keeping mode, it is preferable that the mode be changed from the first keeping mode to the second keeping mode.

More preferably, when the user presses a specific input button, the mode is changed from the first keeping mode to the second keeping mode, and the cold shock operation is repeatedly performed at the predetermined time intervals. Specifically, the input button to allow the user to select the cold shock operation and the input button to allow the user to input the command for the mode change from the first keeping mode to the second keeping mode may be integrated into a single button.

Consequently, when the user presses the single button, the mode is changed from the first keeping mode to the second keeping mode, and the cold shock operation is repeatedly performed, whereby the taste of the Kimchi selected by the user is better maintained. In this case, the taste of the Kimchi is maintained from a point of time when the user presses the input button.

In the cold shock operation, it is possible to perform a control operation such that immediately after the inside temperature of the storage compartment reaches the cold shock temperature, the inside temperature of the storage compartment is increased and returned to the predetermined inside temperature of the storage compartment. Alternatively, when the inside temperature of the storage compartment reaches the cold shock temperature, the storage compartment may be maintained at the cold shock temperature for a predetermined period of time, and then the inside temperature of the storage compartment may be increased and returned to the predetermined inside temperature of the storage compartment. Namely, the cold shock may be applied in the shape of a triangular wave or a rectangular wave. The cold shock may be applied in other shape, too.

Also, when the mode is changed from the fermentation mode to the keeping mode or when the mode is changed from the first keeping mode to the second keeping mode, it is preferable for the cooling speed to have a rapid cooling section.

The rapid cooling section is a section in which the cooling operation is performed faster than the average cooling speed for the mode change.

For example, when the cooling operation is performed from the first keeping mode to the second keeping mode for 13 hours, the average cooling speed for the mode change is (the temperature of the first keeping mode−the temperature of the second keeping mode)/13 hours. The rapid cooling section is a section in which the cooling operation is performed at a cooling speed faster than the average cooling speed.

Preferably, the rapid cooling section has a cooling speed at which the cooling temperature is lowered by 4° C. per hour.

When the rapid cooling section is provided as described above, the mode change is rapidly performed, and therefore, it is further helpful to maintain the Kimchi in a delicious state. The growth of the *Lactobacillus* is restrained by the rapid cooling. The more time for the mode change is increased, the stronger the sour taste of the Kimchi may be.

Meanwhile, it is preferable that different light in color is emitted between at least one section of the keeping mode and at least one section of the cold shock operation.

Preferably, yellow light is emitted in the keeping mode, green light is emitted in the cold shock operation.

More preferably, the yellow light and white light are emitted together, and the green light and white light are emitted together.

Preferably, the green light and the white light are emitted together from a predetermined time before the cold shock operation is initiated.

Also preferably, different light in color is emitted between the time of the mode change and the time before or after the mode change.

For example, the color of the light emitted at the time of the mode change from the fermentation mode to the keeping mode is different from that the light emitted in the fermentation mode or in the keeping mode. Also, it is preferable that even to the mode change from the first keeping mode to the second keeping mode the same is applied.

At the time of the mode change, it is preferable to provide the above-described rapid cooling section and emit green light and white light.

In a further aspect of the present invention, a control method of a Kimchi refrigerator includes steps of performing a fermentation mode, performing a keeping mode, and emitting light into a storage compartment in the fermentation mode or in the keeping mode.

The step of performing a fermentation mode is a step to ferment and ripen Kimchi. The operation conditions of the fermentation mode may be changed depending upon the taste of the Kimchi selected by the user. Also, the operation conditions of the fermentation mode may be changed depending upon kinds of Kimchi.

For example, when the user selects a taste of Kimchi for the winter season, the fermentation mode is performed such that the Kimchi becomes to have the selected taste. When the user selects pickled young radishes, the fermentation mode is performed based on the conditions suitable for the pickled young radishes.

After the fermentation mode is completed, the mode is changed to the keeping mode to store the Kimchi for a long period of time. The keeping mode is a mode to store the Kimchi while restraining the fermentation of the Kimchi. The taste of the Kimchi may be changed depending upon the operation conditions of the keeping mode. In addition, the taste of the Kimchi may be changed even depending upon the change of the external environment.

The step of emitting light is a step of emitting light into the storage compartment, in which the Kimchi is stored, in the fermentation mode or in the keeping mode.

Preferably, a color of the light emitted in the fermentation mode is different from a color of the light emitted in the keeping mode. The control method according to the present invention as described above is a method of controlling the Kimchi refrigerator according to the present invention. The control method may be included in a microprocessor of the control unit as a program. Accordingly, a description of the control method is substituted by the previous description of the Kimchi refrigerator according to the present invention.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
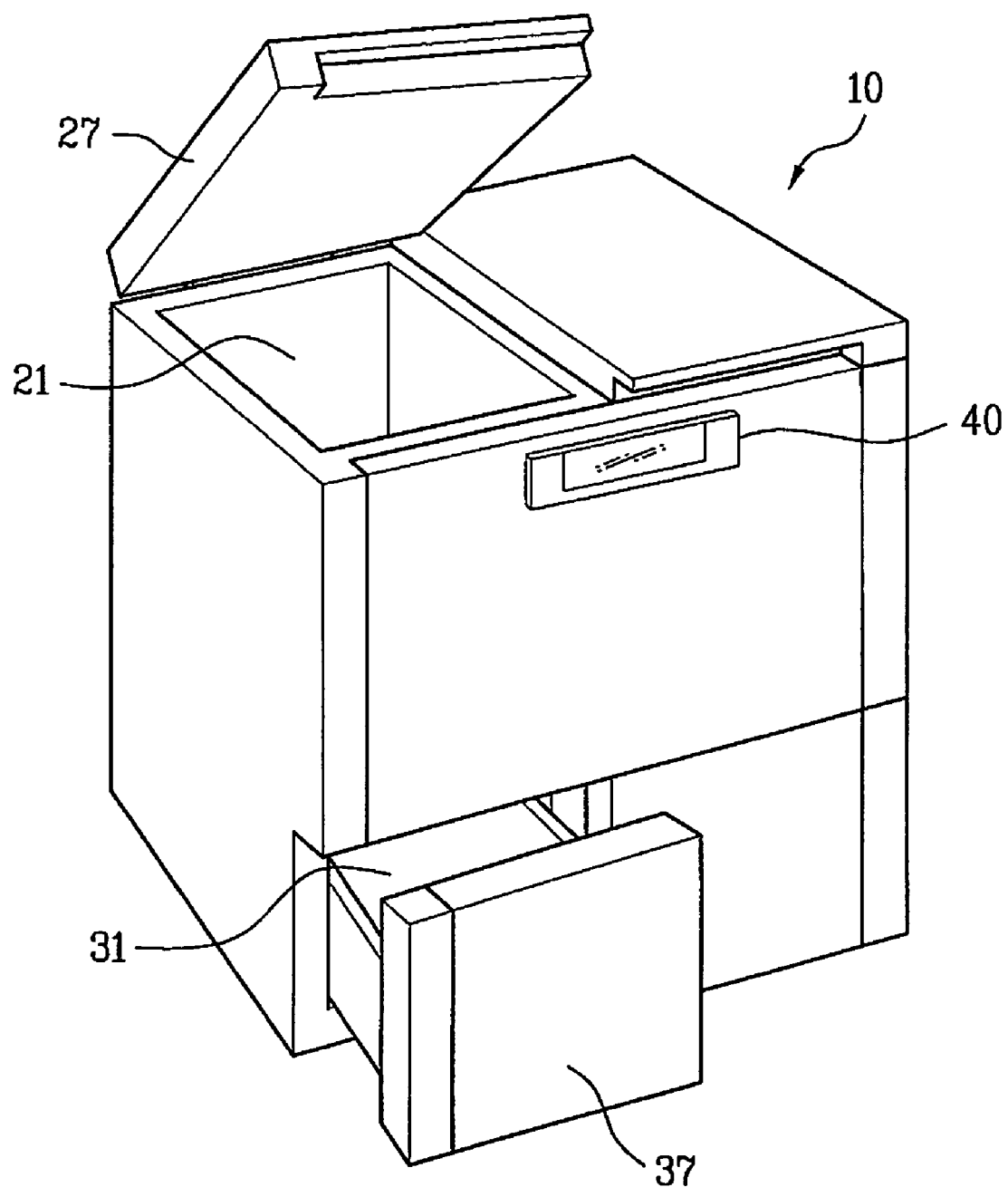
FIG. 1 is a perspective view illustrating a conventional Kimchi refrigerator.

Reference will now be made in detail to the preferred embodiments of the present invention, examples of which are illustrated in the accompanying drawings. Wherever possible, the same reference numbers will be used throughout the drawings to refer to the same or like parts.

The basic construction of a Kimchi refrigerator 100 according to the present invention will be described below with reference to FIGS. 2 and 3.

The Kimchi refrigerator 100 according to this embodiment of the present invention includes Kimchi storage compartments 210 and 310 to store Kimchi, light emitting units 230 and 250 to emit light having a visible ray band into the Kimchi storage compartments 210 and 310, and an input unit 410 constructed to allow a user to input the operation of the emitting units 230 and 250.

The Kimchi storage compartments 210 and 310 are receiving spaces to store Kimchi. The Kimchi storage compartments 210 and 310 are defined by a refrigerator body wall and a bottom surface of the Kimchi refrigerator. In this embodiment, as shown in FIG. 2, the Kimchi storage compartments 210 and 310 are divided into upper Kimchi storage compartments 210 and lower Kimchi storage compartments 310. The Kimchi storage compartments 210 and 310, which are located at the upper and lower parts of the Kimchi refrigerator, are divided into right and left Kimchi storage compartments. Consequently, the Kimchi refrigerator according to this embodiment of the present invention has four Kimchi storage compartments. According to circumstances, however, it is possible that the upper Kimchi storage compartments are divided into right and left Kimchi storage compartments without the provision of the lower Kimchi storage compartments.

In this embodiment, the upper Kimchi storage compartments 210 are constructed such that the upper Kimchi storage compartments 210 are opened and closed by upper doors 270 mounted at the top part of the refrigerator body by hinges, whereas the lower Kimchi storage compartments 310 are constructed such that the lower Kimchi storage compartments 310 are opened and closed by lower doors 370 in a sliding fashion.

Although not shown, on the other hand, it is preferable that gaskets (not shown) be mounted at the edges of the upper doors 270 and the lower doors 370 to seal the Kimchi storage compartments 210 and 310, thereby preventing the inflow and outflow of air between the Kimchi storage compartments 210 and 310 and the outside of the Kimchi refrigerator 100.

Figure 2:
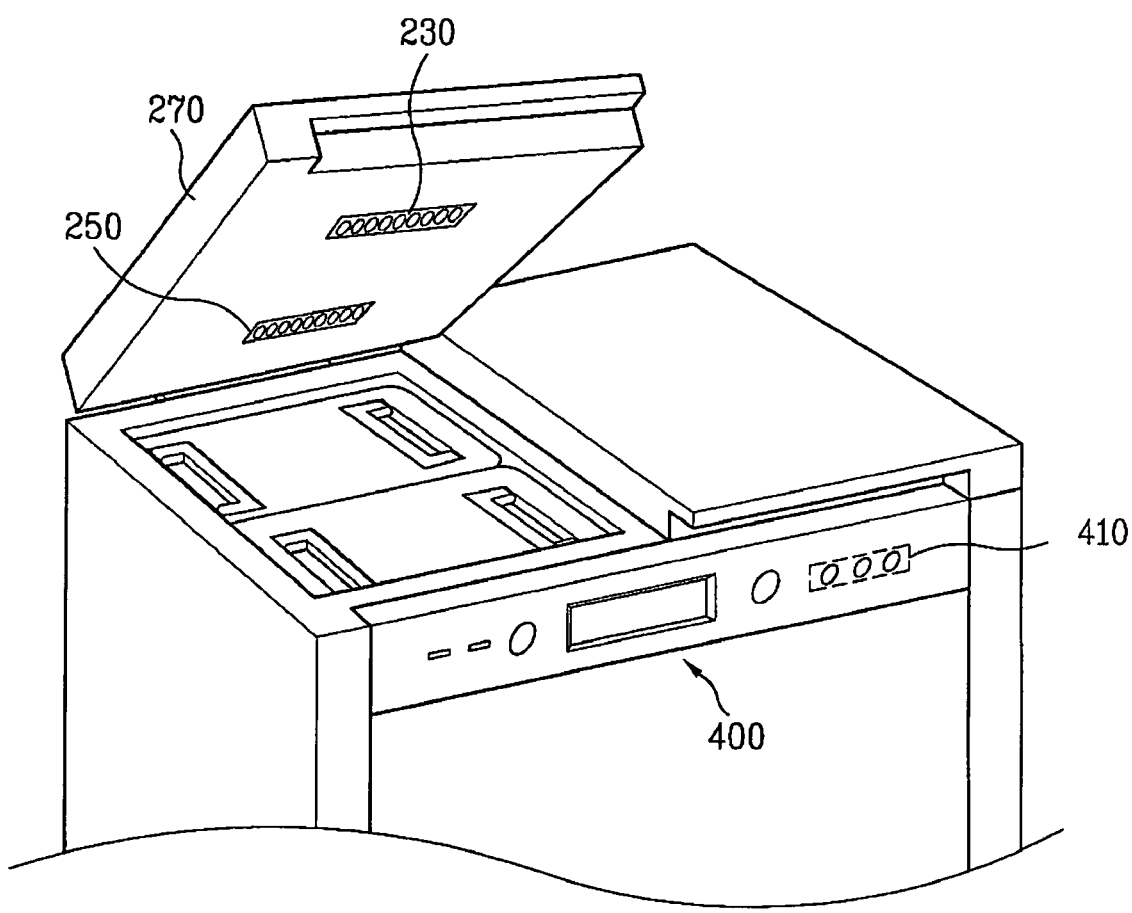
FIG. 2 is a perspective view illustrating a Kimchi refrigerator according to a first embodiment of the present invention.
Figure 3:
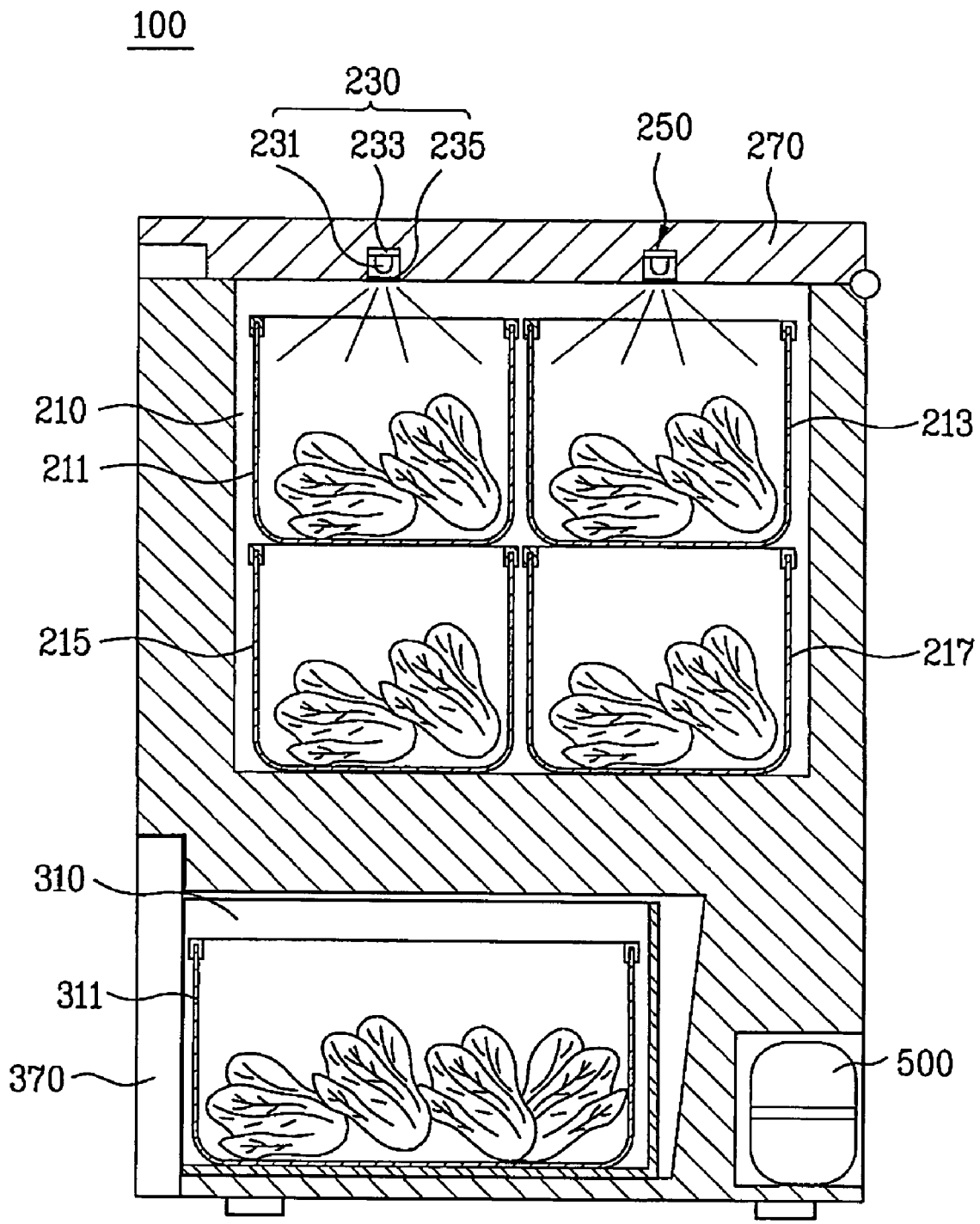
FIG. 3 is a sectional view schematically illustrating the construction of the Kimchi refrigerator of FIG. 2.

As shown in FIGS. 2 and 3, it is general that Kimchi is put in Kimchi storage containers 211, 213, 215, 217 and 311 and stored in the Kimchi storage compartments 210 and 310.

Preferably, the Kimchi storage containers 211, 213, 215, 217 and 311 are made of a transparent material such that light emitted from the emitting units 230 and 250, which will be described below in detail, can be easily transmitted through the transparent material. Alternatively, the Kimchi storage containers 211, 213, 215, 217 and 311 may be made of a semitransparent material such that at least a amount of light can be transmitted through the semitransparent material.

In addition, the Kimchi storage containers 211, 213, 215, 217 and 311 may be made mostly of an opaque material, and only a portion of each of the Kimchi storage containers 211, 213, 215, 217 and 311 may be made of a transparent material such that light emitted from the emitting units 230 and 250, can be transmitted through only the transparent material.

The emitting units 230 and 250 serve to emit light into the Kimchi storage compartments 210 and 310.

The emitting units 230 and 250 may be mounted at the upper and lower parts of the Kimchi refrigerator to emit light into all the Kimchi storage compartments 210 and 310. In this embodiment, however, as shown in FIG. 3, the emitting units 230 and 250 are mounted at the upper part of the Kimchi refrigerator to emit light into only the upper Kimchi storage compartments 210.

Each of the front emitting units 230 includes a substrate 233, a light emitting element 231 mounted on the substrate 233, and a protection cover 235 to prevent permeation of moisture into the light emitting element 231 and thus to prevent the light emitting element 231 from being damaged. Each of the rear emitting units 250 has the same structure as each of the front emitting units 230.

The protection cover 235 serves as a window to disperse light emitted from the light emitting element and uniformly emit the dispersed light into the corresponding storage compartment.

Kinds of the light emitting element 231 are not particularly restricted. It is preferable, however, that the light emitting element 231 include a plurality of light emitting diodes (LED). The light emitting diodes generate heat less than other light emitting elements and have higher efficiency than other light emitting elements. Consequently, the light emitting diodes are suitably used for the Kimchi refrigerator 100. Generally, a light emitting diode emits light with a specific wavelength and a specific color.

In this embodiment, the light emitting element 231 is constituted by the light emitting diodes, and therefore, the heat generation from the emitting units 230 and 250 is minimized. Consequently, the temperature increase due to the light emitting element 231 is minimized, and therefore, the emitting units 230 and 250 can be operated with low power consumption as compared to other emitting units. Meanwhile, the positions of the emitting units 230 and 250 are not particularly restricted. Specifically, the emitting units 230 and 250 may be located at the upper part or the lower part of each Kimchi storage compartment 210. Preferably, however, the emitting units 230 and 250 are located at the upper part of each Kimchi storage compartment 210.

In this embodiment, as shown in FIGS. 2 and 3, the emitting units 230 and 250 are located at the right and left sides of the Kimchi refrigerator such that the emitting units 230 and 250 can emit light into the right Kimchi storage compartment 210 and the left Kimchi storage compartment 210. The emitting units 230 and 250 located at the right and left sides of the Kimchi refrigerator are mounted on the upper doors 270 above the upper Kimchi storage compartments 210. The emitting units 230 and 250 are mounted at the front and rear parts of the upper doors 270, respectively, such that the emitting units 230 and 250 can emit light to the front Kimchi storage containers 211 and to the rear Kimchi storage containers 213, respectively.

In this embodiment, as shown in FIG. 3, light having a visible ray band is emitted to only the Kimchi storage containers 211 and 213 positioned at the upper parts of the upper Kimchi storage compartments 210 among the Kimchi storage containers 211, 213, 215, and 217. However, it is also possible to further include additional emitting units such that the lower Kimchi storage containers 215 and 217 can be emitted by light in various manners.

The input unit 410 serves to select the operation of the emitting units 230 and 250 and to change the color of the emitted light in response to the selected operation. The detailed construction of the input unit 410 will be described below in detail with reference to FIG. 6.

Unexplained reference numeral 500 indicates a compressor, which is a part of a cooling system.

Hereinafter, the arrangement of the light emitting elements on the corresponding upper door will be described with reference to FIGS. 4 and 5.

Figure 4:
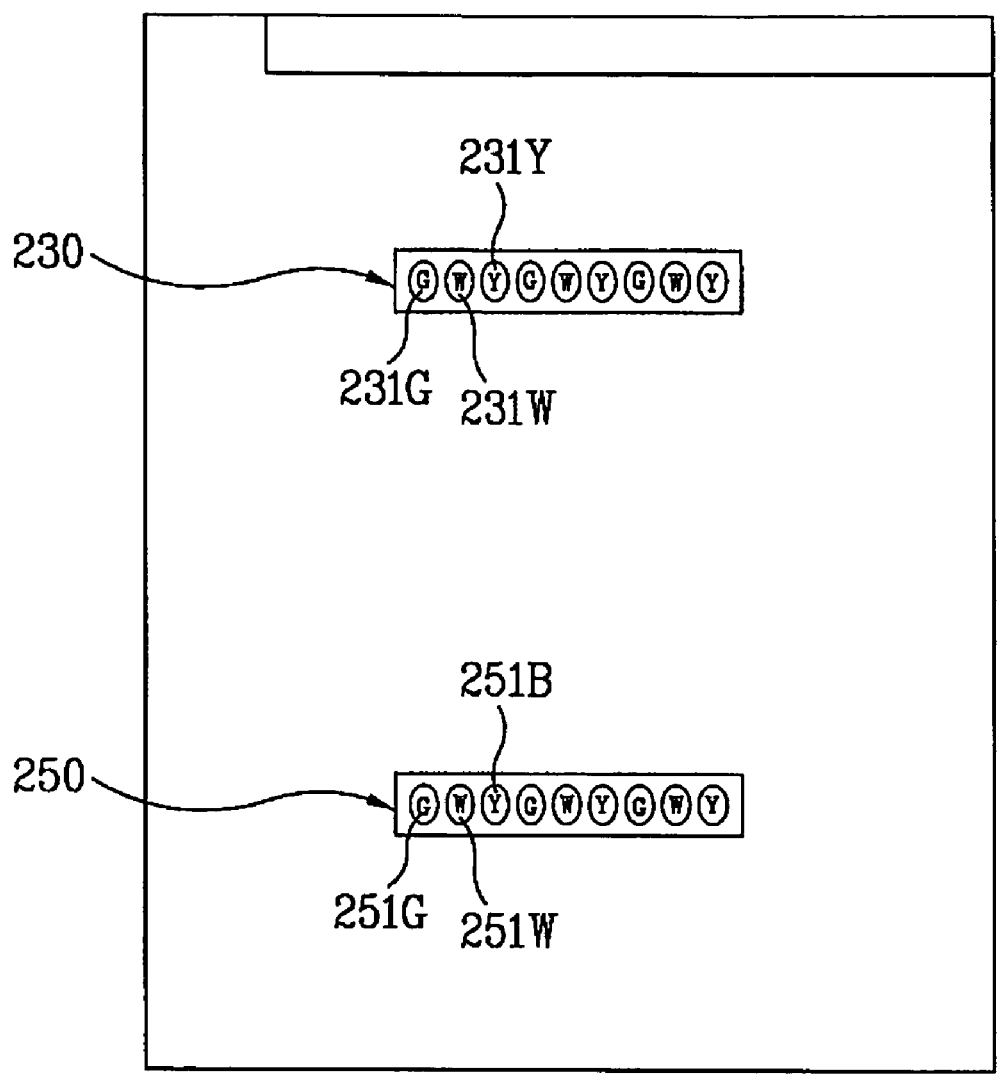
FIG. 4 is a plan view illustrating emitting units of FIG. 2.

FIG. 4 is a view illustrating an example of the position and the arrangement of the light emitting elements. Specifically, FIG. 4 is a plan view illustrating the shape of light emitting elements when the upper emitting units 230 and 250 mounted at the corresponding upper door 270 are viewed from the inside of the corresponding upper Kimchi storage compartment 210. As shown in FIG. 4, the emitting units 230 and 250 are mounted at the front part and the rear part of the corresponding upper door 270, respectively, which is disposed at the top of the corresponding upper Kimchi storage compartment 210.

The front emitting unit 230 includes a total of nine lights constructed in a structure in which green, white, and yellow light emitting elements 231G, 231W, and 231Y are sequentially arranged in line while being spaced the same distance from each other. Similarly, the rear emitting unit 250 is constructed in a structure in which green, white, and yellow light emitting elements 251G, 251W, and 251Y are sequentially arranged in line while being spaced the same distance from each other.

As previously described, a combination of yellow and white or a combination of deep blue and white is preferably used in a keeping mode. This embodiment illustrates the combination of yellow and white.

When the light emitting elements (or lights) are arranged, on the other hand, it is preferable to respectively locate the white light emitting elements 231W and 251W between the green light emitting elements 231G and 251G and the yellow light emitting elements 231Y and 251Y. This is because the white light emitting elements 231W and 251W are light emitting elements which are used both in a Kimchi early-ripening mode (or fermentation mode) and in a Kimchi keeping mode. The white light emitting elements 231W and 251W are used in a way that they emit light together with the green light emitting elements 231G and 251G, respectively, and the same with the yellow light emitting elements 231Y and 251Y. Consequently, it is advantageous to dispose the white light emitting elements 231W and 251W adjacent to the green light emitting elements 231G and 251G and the yellow light emitting elements 231Y and 251Y.

It is preferable that the light emitting elements have a large light emitting angle such that light can be uniformly emitted to food stored in the Kimchi refrigerator. In addition, it is preferable that, as shown in FIG. 4, the light emitting elements be constructed in the shape of an ellipse and the major axis of the ellipse is perpendicular to the direction in which the light emitting elements are arranged, whereby the uniform emission of light is accomplished.

Figure 5:
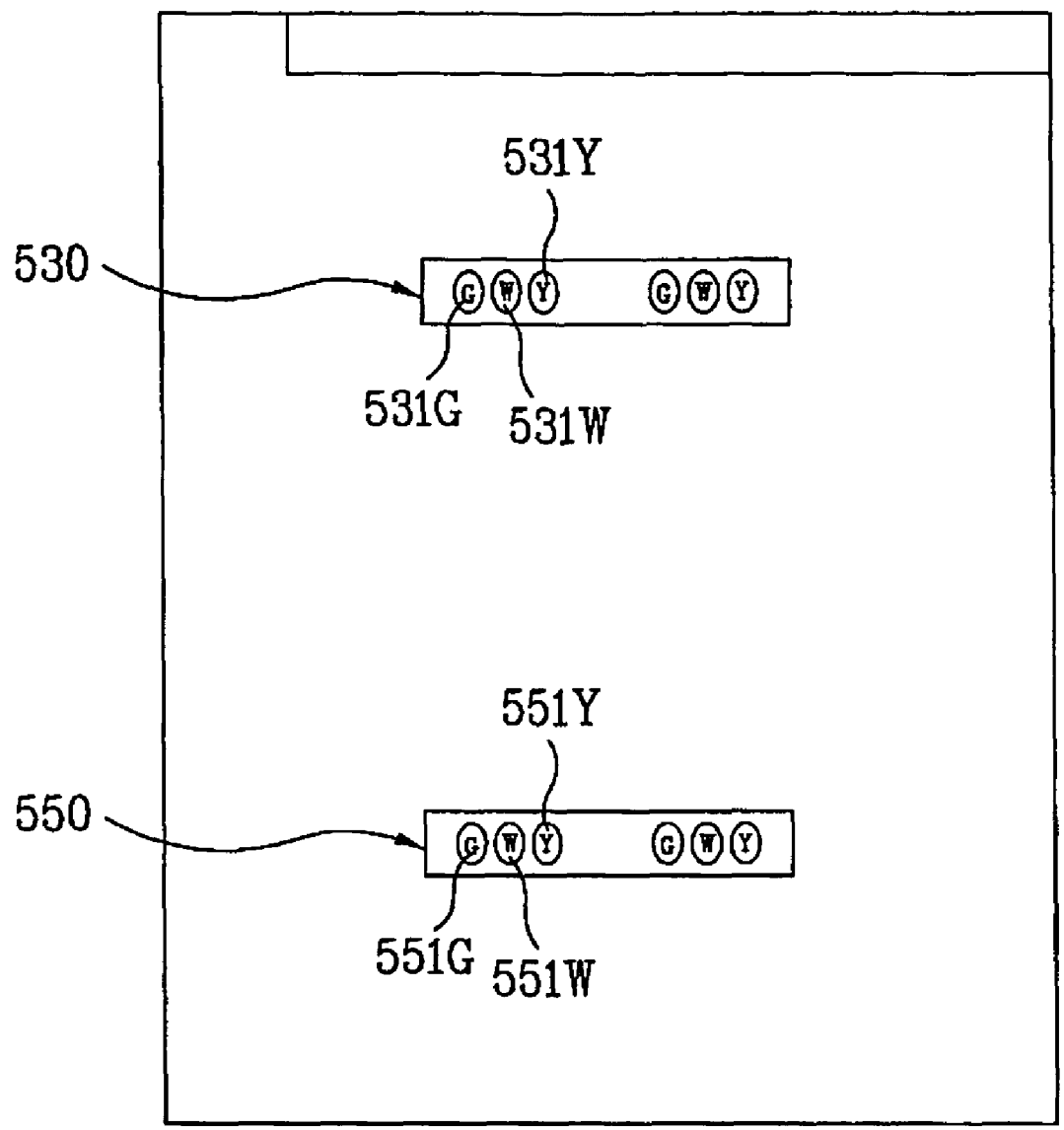
FIG. 5 is a plan view illustrating a modification of the emitting units of FIG. 2.

FIG. 5 is a plan view illustrating a modification of the emitting units. Emitting units 530 and 550 mounted on a corresponding upper door 570 are constructed in a structure in which two sets of green, white, and yellow light emitting elements 531G, 531W, and 531Y in line are disposed at the right and left sides of the emitting unit 530, respectively, and two sets of green, white, and yellow light emitting elements 551G, 551W, and 551Y in line at the right and left sides of the emitting unit 550, respectively. Consequently, the respective emitting units 530 and 550 have a total of 6 light emitting elements.

In this modification, the white light emitting elements 531W and 551W are disposed respectively between the green light emitting elements 531G and 551G and the yellow light emitting elements 531Y and 551Y, as in the above-described embodiment.

Hereinafter, the construction of an input unit according to the present invention will be described with reference to FIG. 6.

In this embodiment, the input unit 410 is mounted in a control panel 400 to control a light emitting unit.

The input unit 410 includes a total of three input buttons. Specifically, the input unit 410 includes an Off button 411, a fermentation mode selecting button 413, and a keeping mode selecting button 415. Although the buttons 411, 413 and 415 are used as input parts, as shown in FIG. 6, other formed means for inputting may be used.

The Off button 411 serves to select the operation of turning off the emitting units 230 and 250. The Off button 411 is selected to stop the operation of the emitting units 230 and 250.

The fermentation mode selecting button 413 serves to select the operation of the emitting units 230 and 250 for the fermentation of Kimchi. According to the selection of the fermentation mode selecting button 413, the emitting units 230 and 250 emit green and white light so as to accelerate the growth of *Leuconostoc* in the initial stage.

The keeping mode selecting button 415 serves to select the operation of the emitting units 230 and 250 for a keeping mode to store Kimchi for a long period of time after fermentation mode. According to the selection of the keeping mode selecting button 415, the emitting units 230 and 250 emit yellow and white light so as to restrain the growth of *Lactobacillus*.

The input unit 410 further includes LEDs 412 and 414, which are display parts to inform the user of the fact that the emitting units 230 and 250 are being operated.

When the emitting units 230 and 250 are operated in a fermentation mode, the LED 412 is turned on. When the emitting units 230 and 250 are operated in a keeping mode, on the other hand, the LED 414 is turned on.

Preferably, the LED 412 is turned on with a characteristic color of the light emitted in the fermentation mode, whereas the LED 414 is turned on with a characteristic color of the light emitted in the keeping mode.

The LEDs 412 and 414 may be constructed in an integrated structure, in other words one LED. In this case, the one LED may be turned on with a color of the emitted light. For example, the integrated LED may be turned on yellow when the yellow light is emitted in the storage compartment. When the green light is emitted, the LED may be turned on green.

Meanwhile, as a result of experiments, the inventor of the present invention has found that, when light including a combination of yellow and white is emitted to maximally restrain the growth of *Lactobacillus*, and, at the same time, light including a combination of green and white, which is applied in the fermentation mode, is emitted for a time corresponding to approximately ⅐ of the emission time for which the light including a combination of yellow and white is emitted, *Leuconostoc* is effectively protected.

Consequently, the emission of light to Kimchi while periodically switching between light including a combination of yellow and white and light including a combination of green and white in the keeping mode is preferable to restrain the growth of *Lactobacillus* and protect *Leuconostoc*.

Figure 6:
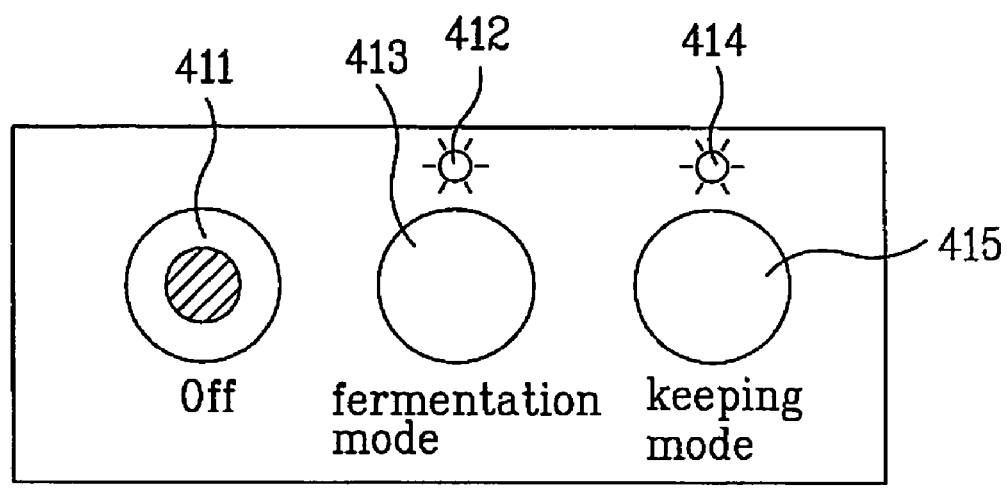
FIG. 6 is a plan view illustrating an input unit of FIG. 2.

As shown in FIG. 6, the input unit 410 is constructed with the buttons. However, it is possible to select the operation mode by the rotation of a selection lever. Other various modifications to the input unit 410 are also possible.

The input unit 410 may be provided for users selecting the operation of the emitting units 230 and 250.

It is also possible to make the emitting units automatically operate according to the mode. For example, when the fermentation mode starts, the emitting units automatically emit green and white light.

When a user selects the fermentation mode, the control unit may control the cooling system to be operated in the fermentation mode and at the same time, the control unit may also control the operation of the emitting units. Consequently, when the user selects a specific mode, the Kimchi refrigerator may be operated in the selected mode, and, at the same time, the emitting units may be operated. The above description is applied to the keeping mode in the same manner.

Hereinafter, a Kimchi refrigerator 600 according to a second embodiment of the present invention will be described with reference to FIGS. 7 and 8.

Figure 7:
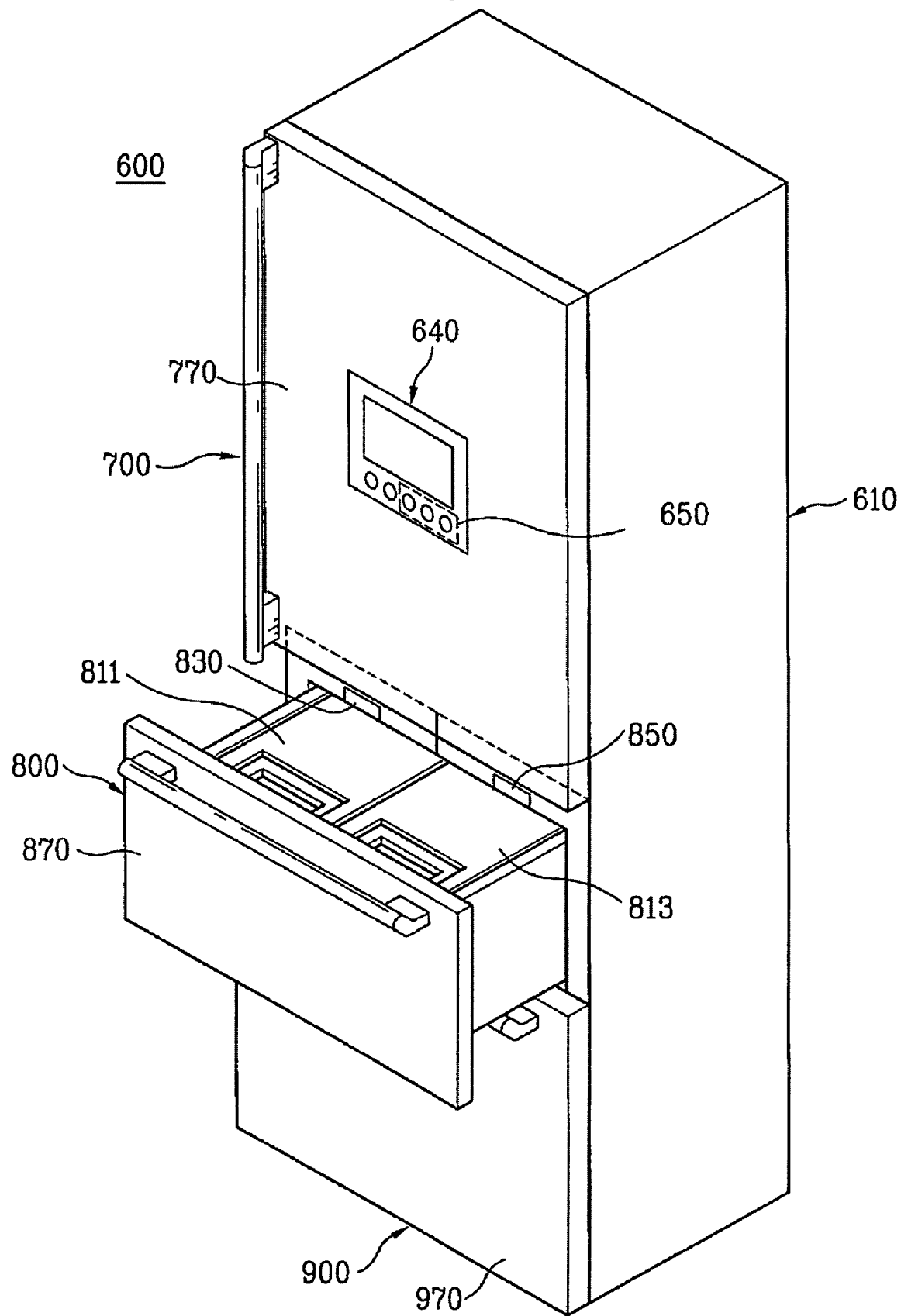
FIG. 7 is a perspective view illustrating a Kimchi refrigerator according to a second embodiment of the present invention.
Figure 8:
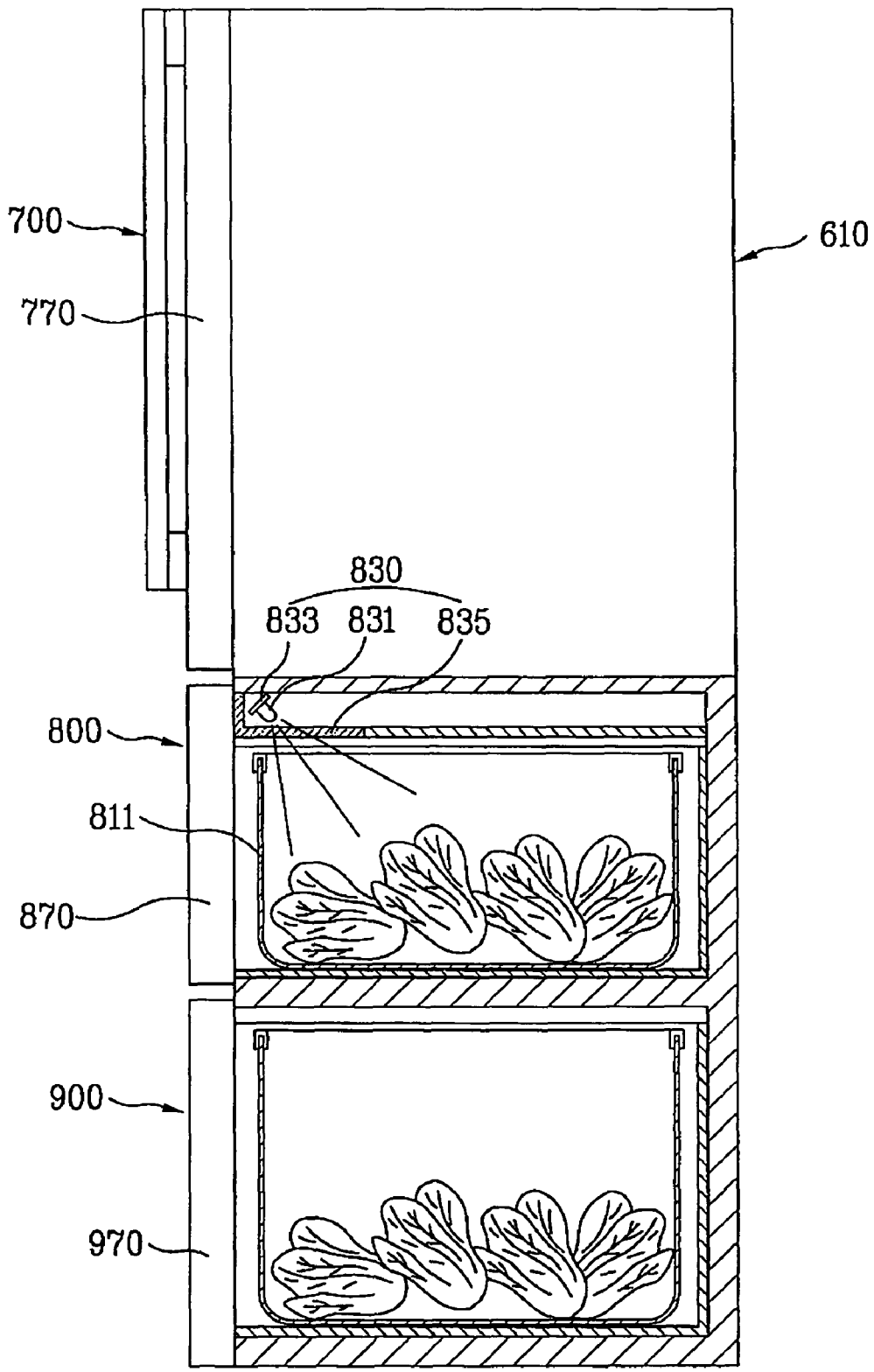
FIG. 8 is a sectional view, in part, of FIG. 7.

As shown in FIG. 7, the Kimchi refrigerator 600 according to this embodiment includes a refrigerating compartment 700, an upper Kimchi storage compartment 800, and a lower Kimchi storage compartment 900.

The refrigerating compartment 700 is opened and closed by a door 770 mounted to a refrigerator body 610 in such a manner that door 770 can be rotated in a hingedly rotating fashion. The upper and lower Kimchi storage compartments 800 and 900 are opened and closed by drawer-type doors 870 and 970, respectively. The refrigerating compartment 700 provides a space to store Kimchi, or, as required, vegetables or meat.

In this embodiment, emitting units 830 and 850 are applied to only the upper Kimchi storage compartment 800. It is also possible, however, that the emitting units 830 and 850 are applied to the refrigerating compartment or the lower Kimchi storage compartment 900. The emitting units 830 and 850 may be also applied to both the upper Kimchi storage compartment 800 and the lower Kimchi storage compartment 900.

In this embodiment, Kimchi storage containers 811 and 813 are received in the upper Kimchi storage compartment 800 at the left and right sides thereof, respectively. Accordingly, the emitting units 830 and 850 are disposed at positions corresponding to the left and right sides of the upper Kimchi storage compartment 800, respectively. Although not shown, the emitting units 830 and 850 are constructed in a structure in which green, white, and yellow light emitting elements are arranged in line as in the above-described first embodiment of the present invention.

The emitting units 830 and 850 are mounted at the front upper end of the upper Kimchi storage compartment 800. As previously described, each of the emitting units 830 and 850 includes a substrate 833, a light emitting element 831 mounted on the substrate 833, and a protection cover 835 to prevent permeation of moisture into the light emitting element 831 and thus to prevent the light emitting element 831 from being damaged. As shown in FIG. 8, the light emitting element 831 is inclined at a predetermined angle toward the upper Kimchi storage compartment 800 such that light from the light emitting element 831 can be uniformly emitted into the upper Kimchi storage compartment 800.

Preferably, the protection cover 835 and the Kimchi storage containers 811 and 813 are made of semitransparent or transparent material such that light emitted from the light emitting element 831 can be satisfactorily transmitted to the Kimchi stored in the Kimchi storage containers 811 and 813.

At the front part of the refrigerating compartment door 770 is mounted a control panel 640 to control the overall operation of the Kimchi refrigerator 600. On the control panel 640 is disposed an input unit 650 to allow a user to select the fermentation degree of the Kimchi such that the operation of the emitting units 830 and 850 can be controlled according to the user's selection.

The construction of the input unit 650 is identical to that of the input unit 410 of the previously described first embodiment of the present invention shown in FIG. 6, and therefore, a detailed description thereof will not be given.

Hereinafter, the operating principle of the food storage container according to the present invention will be described.

First, a user puts Kimchi into a Kimchi storage container, and then places the Kimchi storage container in a Kimchi storage compartment. And light including a combination of a plurality of colors having white is emitted to the Kimchi stored in the Kimchi storage compartment.

Specifically, light including a combination of green and white, which maximally increases *Leuconostoc*, is emitted to the Kimchi in a fermentation mode, whereas light including a combination of yellow (or deep blue) and white, which maximally restrains the increase of *Lactobacillus*, is emitted to the Kimchi in a keeping mode.

The switching between the emitted colors is accomplished by the user's selection of any one of the fermentation mode button and the keeping mode button of the input unit 410.

In the above, the Kimchi refrigerator to store the Kimchi was described. However, the present invention is not limited to the above-described embodiments. For example, the present invention may be applied to various kinds of food including other lactic acid bacteria. Furthermore, the present invention may be applied to other various products, such as, ordinary refrigerators or food storage containers, having a function to store Kimchi in addition to the Kimchi refrigerator.

Accordingly, it will be apparent to those skilled in the art that various modifications and variations can be made in the present invention without departing from the spirit or scope of the inventions. Thus, it is intended that the present invention covers the modifications and variations of this invention.

Unlike the above-described embodiments, on the other hand, the operation mode of the Kimchi refrigerator and the emitting units may be automatically controlled at the same time. Specifically, the control unit may control the emitting units to simultaneously emit green light and white light while the control unit controls the cooling system to perform the fermentation mode. Also, the control unit may control the emitting units to simultaneously emit yellow light (or deep blue light) and white light while the control unit controls the cooling system to perform the keeping mode.

Figure 9:
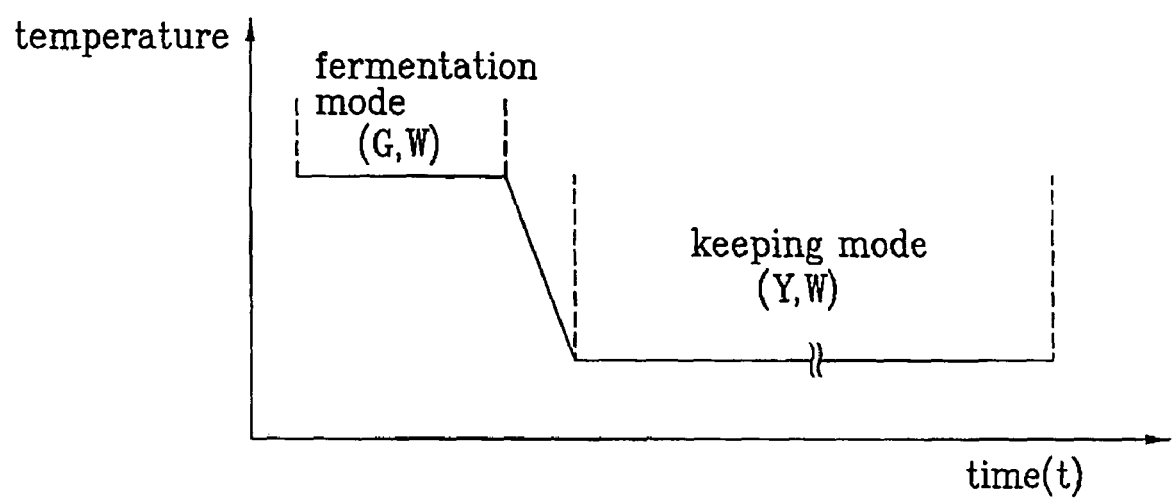
FIGS. 9 to 11 are views respectively illustrating embodiments of an operation course according to the present invention.

In this embodiment, as shown in FIG. 9, when a user selects a specific course having a fermentation mode and a keeping mode, the control unit controls the emitting units to simultaneously emit green light G and white light W while performing the fermentation mode.

After the fermentation mode is completed, the control unit performs the mode changing operation from the fermentation mode to the keeping mode, and controls the emitting units to simultaneously emit yellow light Y and white light W in the keeping mode.

In another embodiment of the present invention, on the other hand, the control unit performs a cold shock operation for a predetermined period of time while performing the keeping mode. At this time, the control unit controls the emitting units such that the colors of the light emitted in the keeping mode are different from the colors of the light emitted at the time of the cold shock operation.

The cold shock operation is an operation to cool the Kimchi storage compartment at a cold shock temperature lower than the temperature of the keeping mode for a predetermined period of time.

Figure 10:
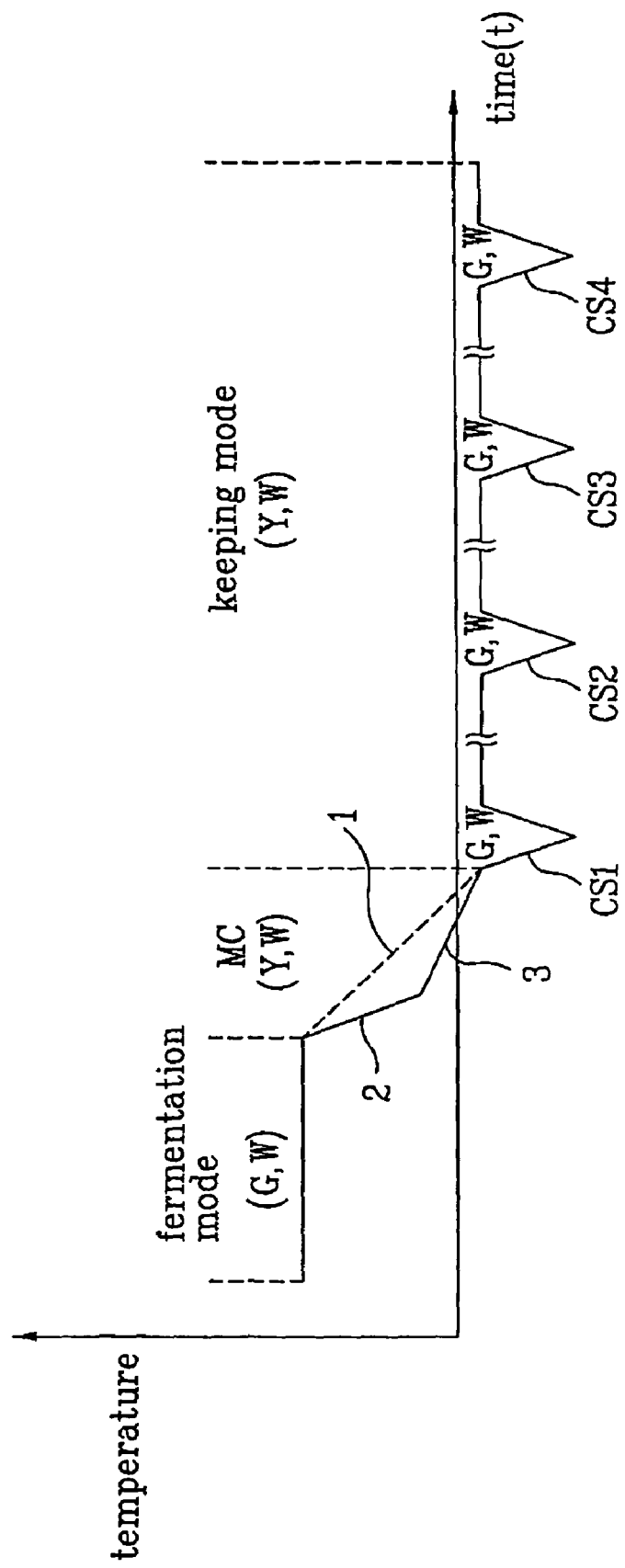

FIG. 10 illustrates that cold shock operations CS are performed at predetermined time intervals in the keeping mode after the fermentation mode is completed.

As shown in FIG. 10, the cold shock operation is accomplished by cooling the Kimchi storage compartment to a temperature lower than the keeping mode temperature for a relatively short period of time.

In the fermentation mode, green light G and white light W are emitted together. In the keeping mode, yellow light Y and white light W are emitted together.

At the time of the cold shock operation CS, the yellow light Y emitted in the keeping mode is turned off, and green light G is turned on. As a result, the green light G and the white light W are emitted together.

When the cold shock operation is completed, and the temperature of the Kimchi storage compartment is returned to the temperature of the keeping mode, the green light G is turned off, and yellow light Y is turned on. As a result, the yellow light Y and the white light W are emitted together.

After a predetermined period of time elapses, the cold shock operation CS and the switching between the light colors of the emitting units are repeatedly carried out.

Meanwhile, when the mode change MC is performed, i.e., the mode is switched from the fermentation mode to the keeping mode, as shown in FIG. 10, the cooling operation is performed at rapid cooling speeds 2 and 3 faster than the average cooling speed 1 for the mode change. Preferably, the first cooling speed 2 of the rapid cooling speeds is a cooling speed at which the cooling temperature is lowered by 4° C. per hour.

When the mode change is performed as described above, the colors of the light emitted from the emitting units are changed into yellow light Y and white light W. Consequently, the yellow light Y and the white light W are emitted from the emitting units. However, the colors of the light emitted when the mode change is performed may be identical to the colors of the light emitted in the fermentation mode. In this case, the keeping mode is performed, and the colors of the light emitted from the emitting units are changed into yellow light Y and white light W.

Figure 11:
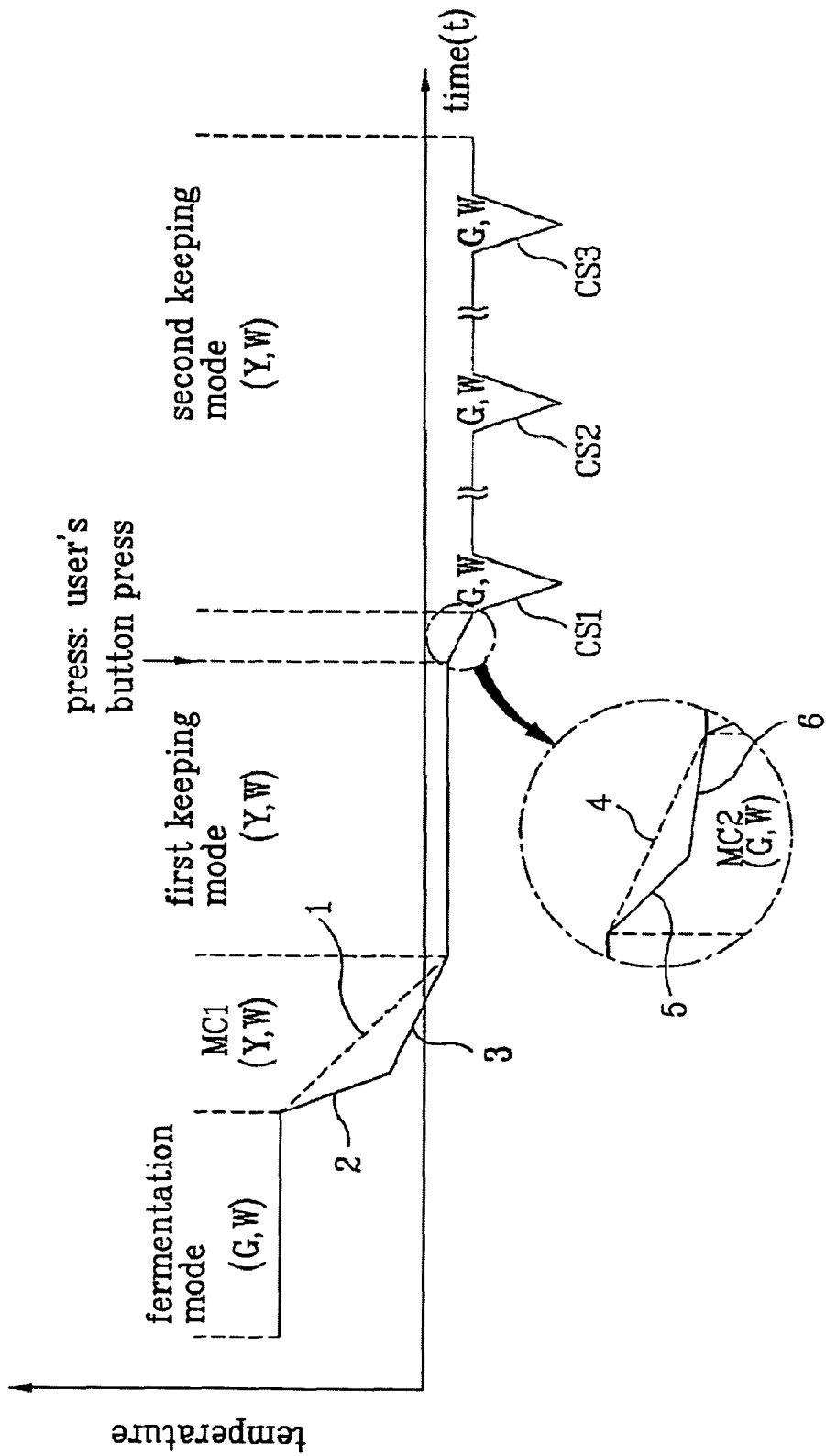

FIG. 11 illustrates another embodiment of the present invention.

In the embodiment of FIG. 11, the keeping mode includes a first keeping mode and a second keeping mode. The temperature of the second keeping mode is lower than that of the first keeping mode. Preferably, the first storage temperature is −1° C., and the second storage temperature is −1.5° C.

In this embodiment, yellow light Y and white light W are also emitted in the keeping mode. When the fermentation mode is completed, the mode change MC1 is performed from the fermentation mode to the keeping mode.

At the time of a cold shock operation CS, green light G and white light W are emitted. In the same manner, the cold shock operation CS is repeatedly performed at predetermined time intervals. Preferably, the repetition time interval of the cold shock operation CS is set to 8 hours. Also preferably, it takes approximately 15 minutes until the temperature is returned to the keeping mode temperature after the commencement of the cold shock operation CS.

In this embodiment, the cold shock operation CS is not performed in the first keeping mode but in the second keeping mode.

When the mode change is performed from the first keeping mode to the second keeping mode, the cooling operation is performed at cooling speeds 5 and 6 faster than the average cooling speed 4 for the mode change.

When the mode change is performed as described above, the light emitted from the emitting units is changed into green light G and white light W.

As soon as the mode change is completed, a cold shock operation CS is performed once, and then the cold shock operation is repeatedly performed at predetermined time intervals.

In this embodiment, the Kimchi refrigerator has an input button (not shown). When a user presses the input button ("the user's button press" of FIG. 11), the mode change MC2 is performed from the first keeping mode to the second keeping mode as shown in FIG. 11, and the cold shock operations CS are performed.

The Kimchi is fermented to an appropriate degree in the fermentation mode. After that, the Kimchi is cooled to the first keeping mode temperature to be kept in the first keeping mode. As time goes in the first keeping mode, the taste of the Kimchi gradually changes. At this time, when the user determines that the taste of the Kimchi is suitable to his/her taste, the user may press the input button. As a result, the mode change is performed from the first keeping mode to the second keeping mode, and the cold shock operations CS are performed.

As the mode change is performed from the first keeping mode to the second keeping mode, and the cold shock operations CS are performed, the taste of the Kimchi found and selected by the user is maintained for a long period of time without being changed.

FIGS. 10 and 11 illustrate the cases in which the performing of the cold shock operation CS and the returning to the keeping mode are performed in the shape of a triangular shaped wave. In this case, when the storage compartment temperature reaches the cold shock temperature, the control unit stops the cold shock operation CS and controls the cooling system to increase the temperature of the Kimchi storage compartment.

Figure 12:
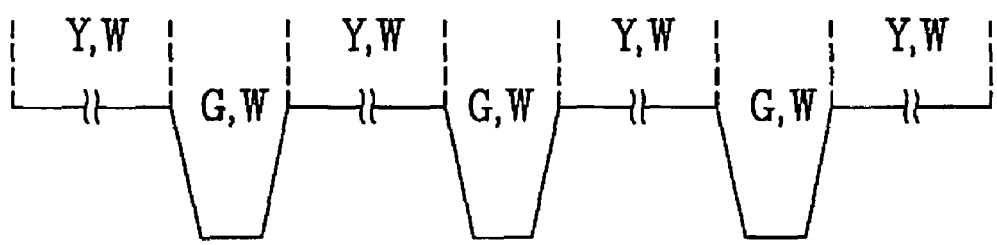
FIGS. 12 and 13 are views respectively illustrating other embodiments of a cold shock operation.
Figure 13:
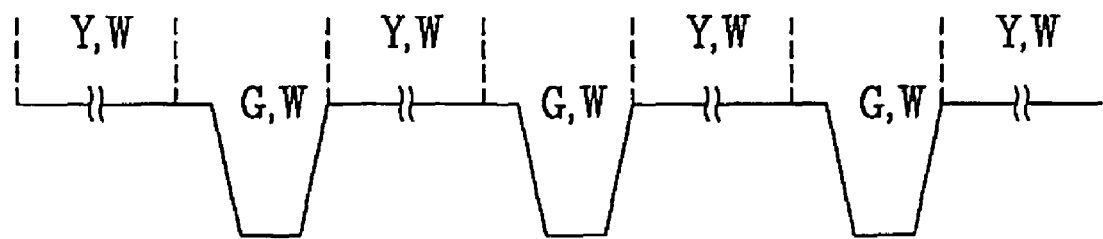

FIGS. 12 and 13 are views respectively illustrating other embodiments of the cold shock operation CS. After the storage compartment temperature has reached the cold shock temperature, the temperature is maintained for a predetermined period of time. In these embodiments, the performing of the cold shock operation CS and the returning to the keeping mode are performed in the shape of approximately a rectangular wave.

Referring to FIG. 13, the light emitted from the emitting units is changed into green light G and white light W a predetermined time before initiating the cold shock operation CS. Preferably, yellow light Y and white light W are emitted for approximately 7 hours, and green light G and white light W are emitted for approximately 1 hour.

In the above-described embodiments, the values related to the time and the temperature are ones obtained through a great number of experiments performed on the effects of the light emission.

Figure 14:
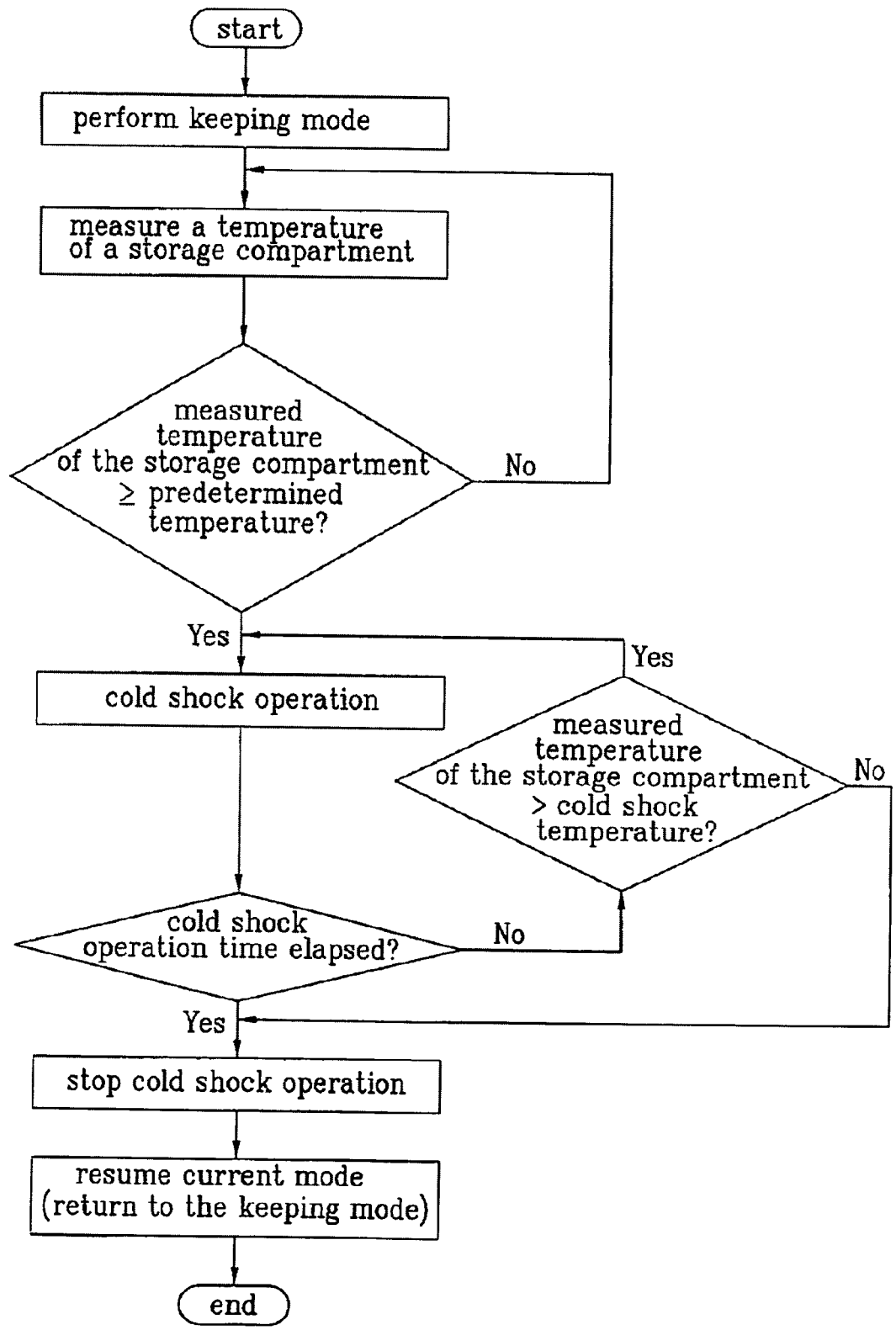
FIG. 14 is a block diagram illustrating a process for performing a cold shock operation when the inside temperature of a storage compartment exceeds a predetermined temperature level.

FIG. 14 is a block diagram illustrating a process for performing a cold shock operation when the inside temperature of the refrigerator, i.e., the inside temperature of the storage compartment, exceeds a predetermined temperature level while the keeping mode is performed.

As shown in FIG. 14, the inside temperature of the storage compartment, in which Kimchi is stored, is continuously detected by a temperature sensor (not shown) mounted in the refrigerator while the keeping mode is performed.

The detected inside temperature of the refrigerator is continuously compared with a temperature level set by a microprocessor.

When the detected inside temperature of the refrigerator exceeds the set temperature level, a cold shock operation is performed to cool the inside temperature of the storage compartment to a cold shock temperature lower than a predetermined keeping mode temperature level for a predetermined period of time.

When the cold shock operation has been performed for the predetermined period of time, and therefore, the set operation time has elapsed, the temperature is returned to the predetermined keeping mode temperature level.

When the inside temperature of the refrigerator detected by the temperature sensor reaches the cold shock operation control temperature, i.e., the cold shock temperature, during the cold shock operation, the cold shock operation is stopped, and the mode is returned to the keeping mode.

Figure 15:
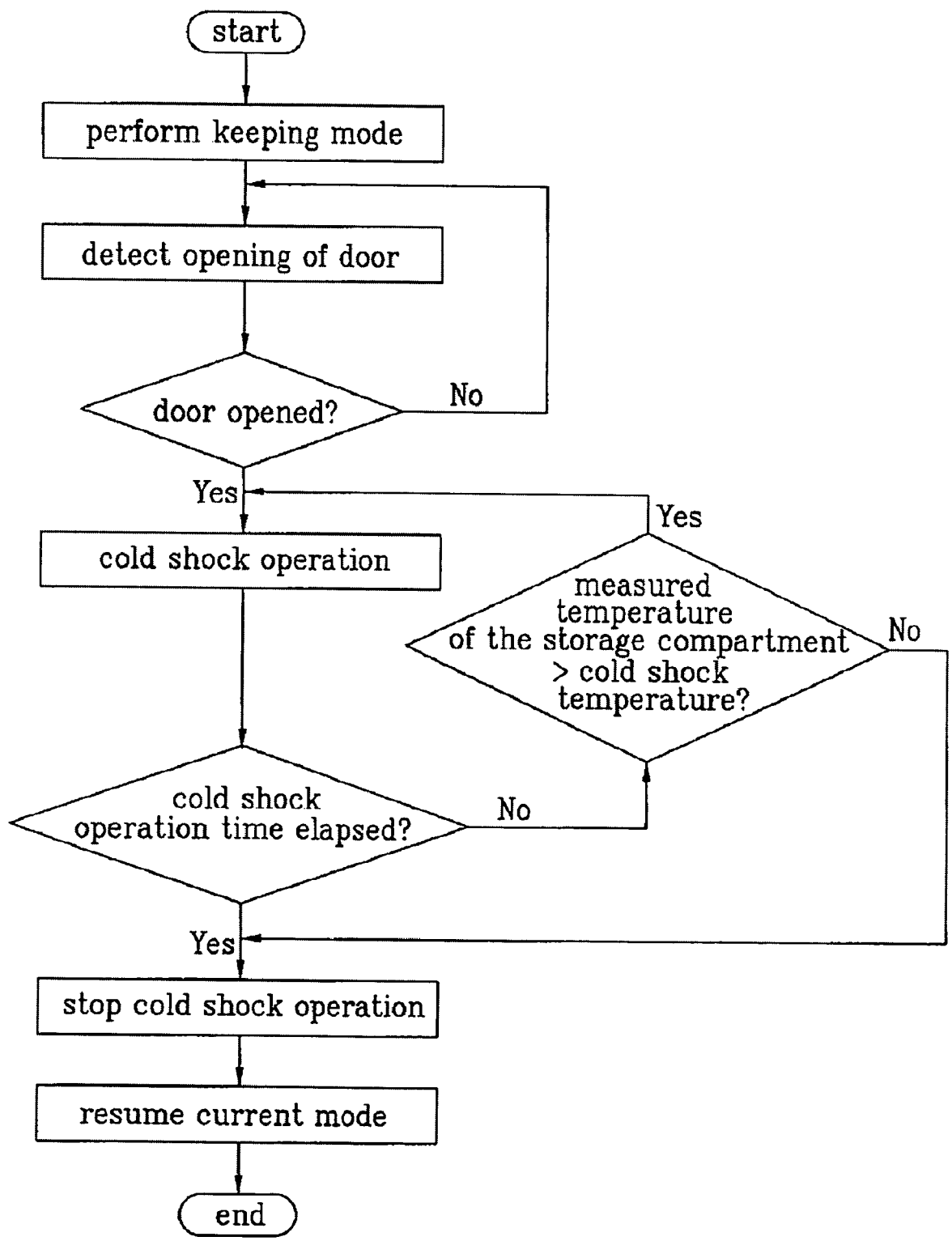
FIG. 15 is a block diagram illustrating a process for performing a cold shock operation when a door is opened and then closed.

FIG. 15 is a block diagram illustrating a process for performing a cold shock operation when a door is opened and then closed.

While the keeping mode is performed, the control unit continuously determines whether the door of the Kimchi refrigerator has been opened using a door sensor.

When it is determined that the door has been opened and then closed based on a signal from the door sensor, the control unit performs a cold shock operation.

When the cold shock operation has been performed for the predetermined period of time, and therefore, the set operation time has elapsed, the control temperature is returned to the predetermined keeping mode temperature level.

When the inside temperature of the refrigerator detected by the temperature sensor reaches the cold shock temperature, during the cold shock operation, the cold shock operation is stopped, and the mode is returned to the keeping mode.

It will be apparent to those skilled in the art that various modifications and variations can be made in the present invention without departing from the spirit or scope of the inventions. Thus, it is intended that the present invention covers the modifications and variations of this invention.

Figure 16:
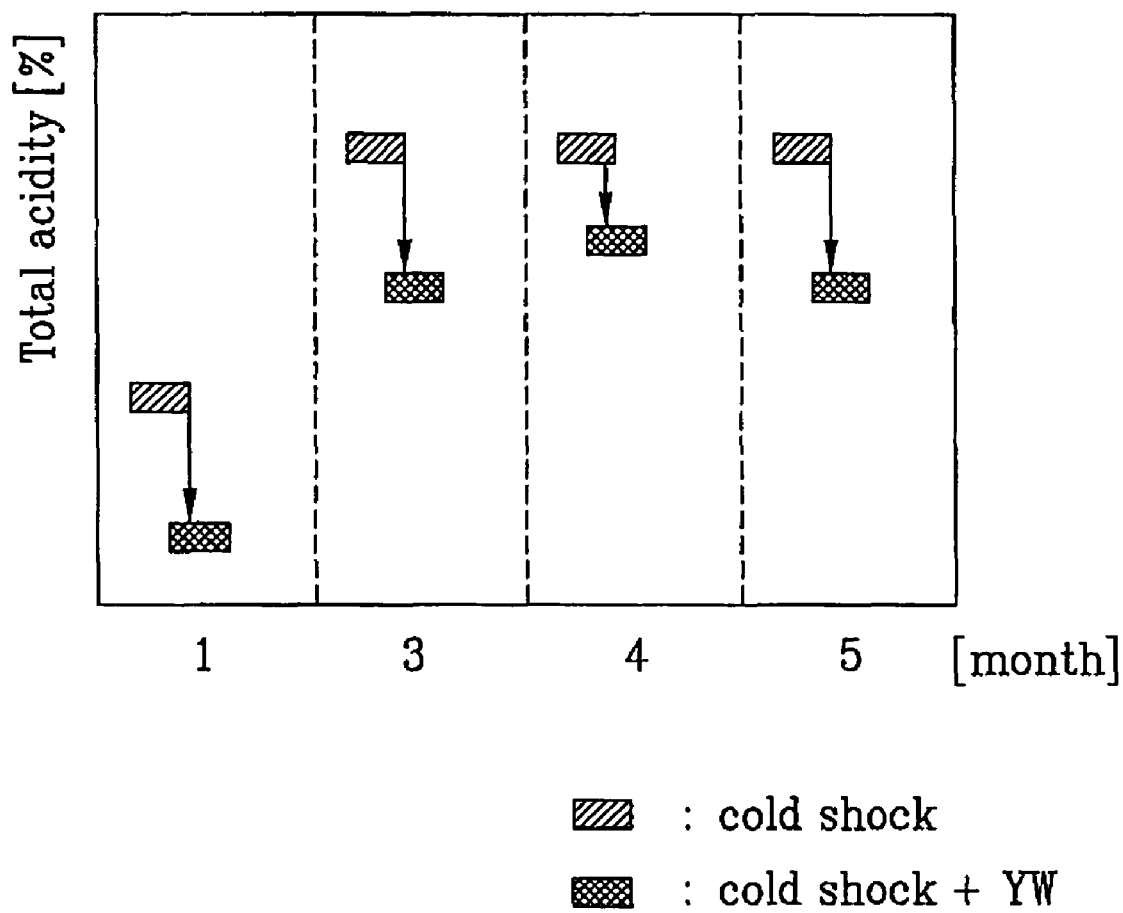
FIG. 16 is a view illustrating acidity of Kimchi based on the storage period of time in a keeping mode.

FIG. 16 is a view illustrating acidity of Kimchi based on the storage period of time in the keeping mode. When the acidity of the Kimchi is increased, a sour taste is increased, and therefore, the taste of the Kimchi becomes bad. When yellow light Y and white light W are emitted simultaneously while the cold shock operation is repeatedly performed in the keeping mode, the acidity of the Kimchi is greatly reduced as compared to the case that only the cold shock operation is repeatedly performed in the keeping mode, as shown in FIG. 16.

Figure 17:
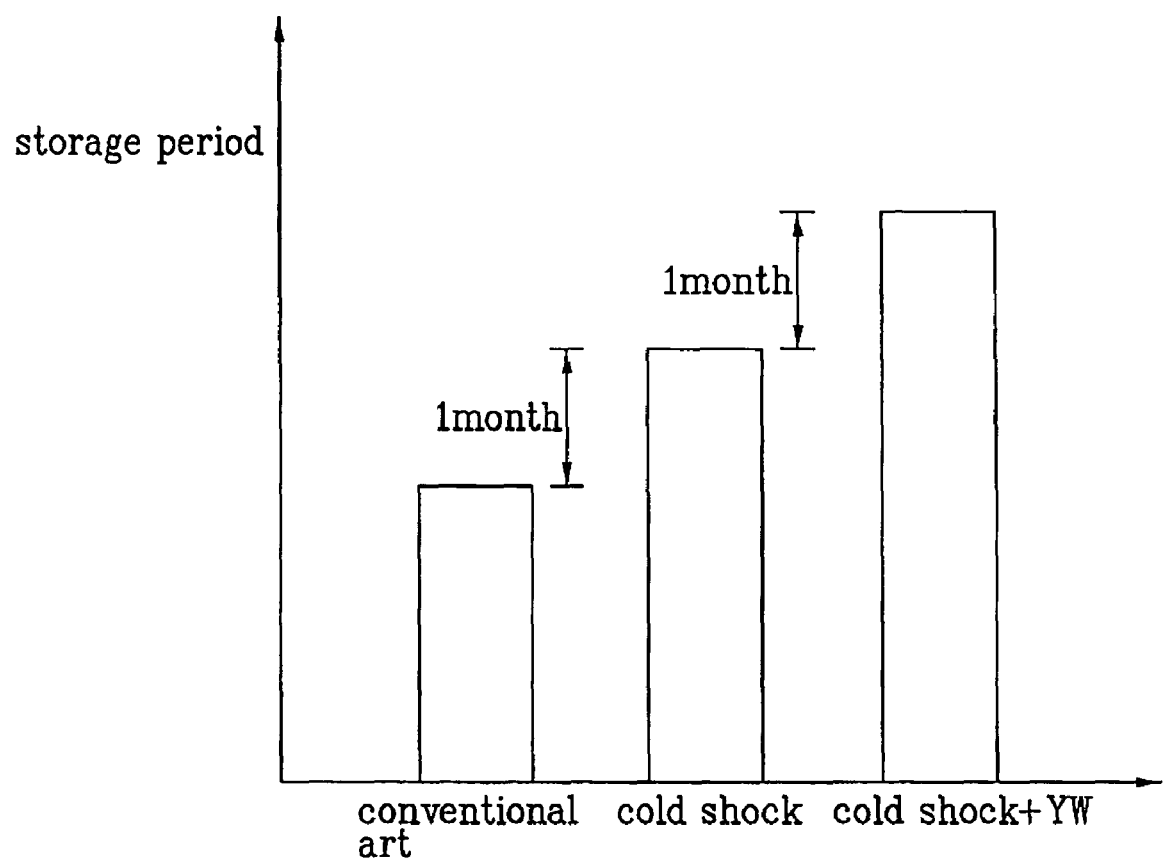
FIG. 17 is a view illustrating the Kimchi storage period of time for the respective cases.

FIG. 17 is a view illustrating the Kimchi storage period of time for the case that the conventional keeping mode was used, the case that the cold shock operation was repeatedly performed in the keeping mode, and the case that yellow light Y and white light W were emitted simultaneously while the cold shock operation was repeatedly performed in the keeping mode.

FIG. 17 illustrates the results of the tests carried out for the respective cases until the acidity of the Kimchi reaches 0.8. As can be seen from FIG. 17, when the cold shock operation was repeatedly performed in the keeping mode, the storage period was extended by approximately one month as compared to the case that the conventional keeping mode was used. Also, it can be seen from FIG. 17 that, when the yellow light Y and the white light W were emitted simultaneously while the cold shock operation was repeatedly performed in the keeping mode, the storage period was extended by approximately one month as compared to the case that the cold shock operation was repeatedly performed in the keeping mode.

According to the present invention, light is emitted to Kimchi so as to control the growth of *Lactobacillus* or *Leuconostoc*, whereby the taste of the Kimchi is improved. Also, the colors of the light can be controlled depending upon the operation mode of the Kimchi refrigerator, whereby the effect of the light emission is further increased.

Furthermore, when the taste of the Kimchi is suitable to user's taste, and, at this time, the user presses a specific input button, the cold shock operation is performed, whereby the taste of the Kimchi is maintained for a long period of time. This greatly contributes to the extension of the storage period.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A refrigerator having at least one storage compartment formed therein, the refrigerator comprising:
   a light emitting unit having a plurality of lights that each emit a different color of light;
   a cooling system that cools the at least one storage compartment; and
   a control unit that controls the cooling system to perform a cold shock operation in a keeping mode of the refrigerator to cool the at least one storage compartment to a cold shock temperature for a predetermined period of time, wherein the cold shock temperature is less than a keeping temperature of the keeping mode, and
   wherein the control unit controls the emitting unit to emit a first color of light in at least one section of the keeping mode, to emit a second color of light in at least one section of the cold shock operation, and controls the emitting unit to change from the second color of light back to the first color of light when the predetermined period of time has elapsed and the cold shock operation is terminated and the keeping mode is resumed, and
   wherein the control unit controls the cooling system to start the keeping mode and lower an inside temperature of the at least one storage compartment to the keeping temperature of the keeping mode upon termination of a fermentation mode so as to store fermented matter at the keeping temperature, and
   wherein the keeping mode includes a first keeping mode and a second keeping mode, the second keeping mode being continuous with the first keeping mode, and wherein the control unit controls the cooling system so that a termination of the first keeping mode and a start of the second keeping mode without interposing the fermentation mode between the first keeping mode and the second keeping mode, wherein a second keeping temperature of the second keeping mode is lower than a first keeping temperature of the first keeping mode.

2. The refrigerator of claim 1, wherein the plurality of lights includes a first light that emits green light and a second light that emits yellow light, and wherein the control unit controls the emitting unit to emit yellow light in the at least one section of the keeping mode and to emit green light in the at least one section of the cold shock operation.

3. The refrigerator of claim 2, wherein the plurality of lights includes a third light that emits white light, and wherein the control unit controls the emitting unit to emit yellow light and white light together in the at least one section of the keeping mode and to emit green light and white light together in the at least one section of the cold shock operation.

4. The refrigerator of claim 3, wherein the control unit controls the emitting unit to emit green light and white light together for a predetermined amount of time before the cold shock operation is initiated.

5. The refrigerator of claim 1, further comprising an input unit that receives operation commands and transmits the received operation commands to the control unit, wherein the input unit includes an input part that provides for input of a command to initiate the cold shock operation.

6. The refrigerator of claim 5, wherein the control unit repeatedly performs the cold shock operation at predetermined time intervals in response to receipt of the command to initiate the cold shock operation.

7. The refrigerator of claim 1, wherein the control unit stops the cold shock operation and controls the cooling system to increase an inside temperature of the at least one storage compartment when the inside temperature of the at least one storage compartment reaches the cold shock temperature.

8. The refrigerator of claim 1, wherein the control unit controls the emitting unit such that a color of light emitted during a transition from the fermentation mode to the keeping mode is different from a color of light emitted in the fermentation mode, and different from a color of light emitted in the keeping mode.

9. The refrigerator of claim 8, wherein the control unit controls the cooling system to perform at least one rapid cooling section during the transition from the fermentation mode into the keeping mode, wherein a cooling speed of the rapid cooling section is greater than an average cooling speed for the transition from the fermentation mode into the keeping mode.

10. The refrigerator of claim 1, wherein the control unit controls the cooling system to cool the at least one storage compartment from the first keeping temperature of the first keeping mode to the second keeping temperature of the second keeping mode so as to transition from the first keeping mode to the second keeping mode.

11. The refrigerator of claim 10, further comprising an input unit that receives operation commands and transmits the received operation commands to the control unit, wherein the input unit includes an input part that provides for input of a command to initiate the transition from the first keeping mode to the second keeping mode.

12. The refrigerator of claim 10, wherein the control unit controls the emitting unit such that colors of light emitted during the transition from the first keeping mode to the second keeping mode are different from colors of light emitted in the first keeping mode or the second keeping mode.

13. The refrigerator of claim 1, further comprising an input unit that receives operation commands and transmits the received operation commands to the control unit, wherein the input unit includes an input part that provides for input of a command to turn the light emitting unit on or off.

14. The refrigerator of claim 1, further comprising a display part that displays an operation state of the light emitting unit.

15. The refrigerator of claim 1, wherein the plurality of lights includes a first light that emits green light, a second light that emits yellow light and a third light that emits white light, and wherein the emitting unit emits white light in combination with either yellow light or green light in both the keeping mode and the cold shock operation.

* * * * *